US007060482B1

(12) United States Patent
Sung et al.

(10) Patent No.: US 7,060,482 B1
(45) Date of Patent: Jun. 13, 2006

(54) THERMOSTABLE XYLANASES

(75) Inventors: Wing L. Sung, Gloucester (CA); Jeffrey S. Tolan, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/856,025

(22) PCT Filed: Nov. 16, 1999

(86) PCT No.: PCT/CA99/01093

§ 371 (c)(1), (2), (4) Date: Sep. 13, 2001

(87) PCT Pub. No.: WO00/29587

PCT Pub. Date: May 25, 2000

Related U.S. Application Data

(60) Provisional application No. 60/108,504, filed on Nov. 16, 1998.

(51) Int. Cl.
- *C12N 9/00* (2006.01)
- *C12N 9/25* (2006.01)
- *C12P 21/06* (2006.01)
- *C07H 21/04* (2006.01)
- *A23L 1/31* (2006.01)

(52) U.S. Cl. .............................. 435/200; 435/4; 435/6; 435/69.1; 435/183; 435/210; 530/350; 536/23.2; 536/23.4; 536/23.7; 426/56; 426/531

(58) Field of Classification Search ............... 536/23.2, 536/23.7, 23.24, 23.4; 435/252.3, 254.1, 435/254.11, 254.6, 4, 6, 15, 69.1, 183, 195, 435/200, 320.1; 530/350; 426/56, 531
See application file for complete search history.

(56) References Cited

U.S. PATENT DOCUMENTS

| 5,405,769 A | 4/1995 | Campbell et al. |
| 5,759,840 A * | 6/1998 | Sung et al. .................. 435/200 |

FOREIGN PATENT DOCUMENTS

| EP | 0828002 | 3/1998 |
| WO | WO 9424270 | 10/1994 |
| WO | WO 9529997 | 11/1995 |

OTHER PUBLICATIONS

Wakarchuk et al. "Thermostabilization of the Bacillus Circulans Xylanase by the Introduction of Disulfide Bonds," *Protein Engineering* 7(11):1379-1386 (1994).

Marquardt et al. "Recommendations for future research on the use of enzymes in animal feeds," *Enzymes in Poultry and Swine Nutrition*, pp. 129-138 (Jun. 1997).

Liu et al. "Exogenous enzymes for pig diets: an overview," *Enzymes in Poultry and Swine Nutrition*, pp. 115-128 (Jun. 1997).

Guenter "Practical experience with the use of enzymes," *Enzymes in Poultry and Swine Nutrition*, pp. 53-62.

Arase et al. "Stabilization of xylanase by random mutagenesis," *Federation of European Biochemical Societies*, 316(2):123-127 (Jan. 1993).

Cowan "Protein stability at high temperatures," *Essays in Biochemistry*, vol. 29, pp. 193-207 (1995).

Gupta "Thermostabilization of Proteins," *Biotechnology and Applied Biochemistry*, vol. 14, pp. 1-11 (1991).

Paloheimo et al. "Thermostable Xylanases Produced by Recombinant *Trichoderma Reesei* for Pulp Bleaching," *Carbohydrases from Trichoderma reesei and Other Microorganisms*, pp. 255-264 (1997).

Sung et al. "Overexpression of the *Bacillus subtilis* and *circulans* Xylanases in *Escherichia coili*," *Protein Expression and Purification*, vol. 4, pp. 200-206 (1993).

Sung et al. "Short synthetic oligodeoxyribonucleotide leader sequences enhance accumulation of human proinsulin synthesized in *Escherichia coli*," *Proc. Natl. Acad. Sci. USA*, vol. 83, pp. 561-565.

Vivcros et al. "Effect of enzyme supplementation of a diet based on barley, and autoclave treatment, on apparent digestibility, growth performance and gut morphology of broilers," *Animal Feed Science and Technology*, vol. 48, pp. 237-251 (1994).

\* cited by examiner

*Primary Examiner*—Manjunath N. Rao
(74) *Attorney, Agent, or Firm*—Needle & Rosenberg PC

(57) ABSTRACT

The present invention is directed to thermostable xylanase enzymes are suitable for feed pelleting applications. The novel xylanase enzymes comprise at least 40% of their optimal activity from a pH range from about pH 3.5 to about pH 6.0, and from about 40 to about 60° C., and exhibit at least 30% of their optimal activity after a pre-incubation step for 30 minutes at 70° C. in the presence of 40% glycerol. Also disclosed are modified xylanase molecules comprising either a basic amino acid at position 162 (TrX numbering), or its equivalent position in other xylanase molecules, at least one disulfide bridge, or a combination thereof. The thermostable xylanase molecules of the present invention have a physiological temperature and pH optima and are useful as animal feeds additives since they can withstand the heat associated with feed sterilization and pellet formation, yet they exhibit optimal activity within an animal to aid in breakdown of ingested feed.

9 Claims, 12 Drawing Sheets

```
Ca    23                                                                S AFNTQAAP   31
Cs     1                                                                G            1

Bp     1           RTITNNEMGN HSGYDYELWK DYGNT-SMTL NNGGAFSAGW N--NIGNA              45
Ca    32           KTITSNEIGV NGGYDYELWK DYGNT-SMTL KNGGAFSCQW S--NIGNA              76
Cs     2           RIIYDNETGT HGGYDYELWK DYGNT-IMEL NDGGTFSCQW S--NIGNA              46
Rf     1           SAADQQTRGN VGGYDYEMWN QNGQGQASMN PGAGSFTCSW S--NIENF              46
Tr2    1           QTIQPGTGY  NNGYFYSYWN DGHGGVTYTN GPGGQFSVNW S--NSGNF              45
Tv     1           QTIQPGTGF  NNGYFYSYWN DGHGGVTYTN GPGGQFSVNW S--NSGNF              45
Th     1           QTIGPGTGY  SNGYYYSYWN DGHAGVTYTN GGGGSFTVNW S--NSGNF              45
Sc     1           SGTPSSTGT  DGGYYYSWWT DGAGDATYQN NGGGSYTLTW SG-NNGNL              46
An     1                    S AGINYVQNYN GNLGDFTY-D ESAGTFSMYW EDGVSSDF              38
AT     1                    S AGINYVQNYN QNLGDFTY-D ESAGTFSMYW EDGVSSDF              38
Tr1    1                      ASINYDQNYQ TGG-QVSYS- PSNTGFSVNW N--TQDDF              34
Ss     1           ATTIT-NETGY D-GMYYSFWT DGGGSVSMTL NGGGSYSTRW T--NCGNF              45
S1B    1           DTVVTTNQEGT NNGYYYSFWT DSQGTVSMNM GSGGQYSTSW R--NTGNF              47
S1C    1           ATTITTNQTGT D-GMYYSFWT DGGGSVSMTL NGGGSYSTQW T--NCGNF              46
Tf     1           AVTSNETGY  HDGYFYSFWT DAPGTVSMEL GPGGNYSTSW R--NTGNF              45
Bc     1                      ASTDYWQNWT DGGGIVNAVN GSGGNYSVNW S--NTGNF              36
Bs     1                      ASTDYWQNWT DGGGIVNAVN GSGGNYSVNW S--NTGNF              36

Bp    46   LFRK-GKKFD ST-RTHHQLG NISINYNASF N-PSGNSYLC VYGWTQSP              90
Ca    77   LFRK-GKKFN DT-QTYKQLG NISVNYNCNY Q-PYGNSYLC VYGWTSSP             121
Cs    47   LFRK-GRKFN SD-KTYQELG DIVVEYGCDY N-PNGNSYLC VYGWTRNF              91
Rf    47   LARM-GKNYD SQKKNYKAFG NIVLTYDVEY T-PRGNSYMC VYGWTRNP              92
Tr2   46   VGGK-GWQPG TKNKV----- ---INFS-GS YNPNGNSYLS VYGWSRNP              83
Tv    46   VGGK-GWQPG TKNKV----- ---INFS-GS YNPNGNSYLS VYGWSRNP              83
Th    46   VGGK-GWQPG TKNKV----- ---INFS-GS YNPNGNSYLS IYGWSRNP              83
Sc    47   VGGK-GWNPG AASRS----- ---ISYS-GT YQPNGNSYLS VYGWTRSS              84
An    39   VVGL-GWTTG SSNA------ ---ITYSAEY SASGSSSYLA VYGWVNYP              76
At    39   VVGLGGWTTG SSNA------ ---ITYSAEY SASGSASYLA VYGWVNYP              77
Tr1   35   VVGV-GWTTG SSAP------ ---INFGGSF SVNSGTGLLS VYGWSTNP              72
Ss    46   VAGK-GWANG GR-RT----- ---VRYT-GW FNPSGNGYC  LYGWTSNP              82
S1B   48   VAGK-GWANG GR-RT----- ---VQYS-GS FNPSGNAYLA LYGWTSNP              84
S1C   47   VAGK-GWSTG DGN------- ---VRYN-GY FNPVGNGYC  LYGWTSNP              82
Tf    46   VAGK-GWATG GR-RT----- ---VTYS-AS FNPSGNAYLT LYGWTRNP              82
Bc    37   VVGK-GWTTG SPFRT----- ---INYNAGV WAPNGNGYLT LYGWTRSP              75
Bs    37   VVGK-GWTTG SPFRT----- ---INYNAGV WAPNGNGYLT LYGWTRSP              75
```

FIGURE 1

```
Bp   91  LAEYYIVDSW GTYR-PT--G AYKGSFYADG GTYDIYETTR VNQPSIIG 135
Ca  122  LVEYYIVDSW GSWRPP--GG TSKGTITVDG GIYDIYETTR INQPSIQG 167
Cs   92  LVEYYIVESW GSWRPP--GA TPKGTITQWMAGTYEIYETTR VNQPSIDG 138
Rf   93  LMEYYIVEGW GDWRPPGNDG EVKGTVSANG NTYDIRKTMR YNQPSLDG 140
Tr2  84  LIEYYIVENF GTYN-PSTGA TKLGEVTSDG SVYDIYRTQR VNQPSIIG 130
Tv   84  LIEYYIVENF GTYN-PSTGA TKLGEVTSDG SVYDIYRTQR VNQPSIIG 130
Th   84  LIEYYIVENF GTYN-PSTGA TKLGEVTSDG SVYDIYRTQR VNQPSIIG 130
Sc   85  LIEYYIVESY GSYD-PSSAA SHKGSVTCNG ATYDILSTWR YNAPSIDG 131
An   77  GAEYYIVEDY GDYN-PCSSA TSLGTVYSDG STYQVCTDTR INEPSITG 123
At   78  QAEYYIVEDY GDYN-PCSSA TSLGTVYSDG STYQVCTDTR INEPSITG 124
Tr1  73  LVEYYIMEDN HNY--PAQ-G TVKGTVTSDG ATYTIWENTR VNEPSIQG 117
Ss   83  LVEYYIVDNW GSYR-PT--G ETRGTVHSDG GTYDIYKTTR YNAPSVEA 127
S1B  85  LVEYYIVDNW GTYR-PT--G EYKGTVTSDG GTYDIYKTTR VNKPSVEG 129
S1C  83  LVEYYIVDNW GSYR-PT--G TYKGTVSSDG GTYDIYQTTR YNAPSVEG 127
Tf   83  LVEYYIVESW GTYR-PT--G TYMGTVTTDG GTYDIYKTTR YNAPSIEG 127
Bc   76  LIEYYVVDSW GTYR-PT--G TYKGTVKSDG GTYDIYTTTR YNAPSIDG 120
Bs   76  LIEYYVVDSW GTYR-PT--G TYKGTVKSDG GTYDIYTTTR YNAPSIDG 120

Bp  136  -IATFKQYWS VRQTKRTS-- ------GTVS VSAHFRKWES LGMPM-GK 174
Ca  168  -NTTFKQYWS VRRTKRTS-- ------GTIS VSKHFAAWES KGMPL-GK 206
Cs  139  -TATFQQYWS VRTSKRTS-- ------GTIS VTEHFKQWER MGMRM-GK 177
Rf  141  -TATFPQYWS VRQTSGSANN QTNYMKGTID VSKHFDAWSA AGLDMSGT 187
Tr2 131  -TATFYQYWS VRRNHR-S-S ------GSVN TANHFNAWAQ QGLTL-GT 168
Tv  131  -TATFYQYWS VRRTHR-S-S ------GSVN TANHFNAWAQ QGLTL-GT 168
Th  131  -TATFYQYWS VRRNHR-S-S ------GSVN TANHFNAWAS HGLTL-GT 168
Sc  132  -TQTFEQFWS VRNPKKAPGG SIS---GTVD VQCHFDAWKG LGMNLGSE 175
An  124  -TSTFTQYFS VRESTRTS-- ------GTVT VANHFNFWAQ HGFGN-SD 162
At  125  -TSTFTQYFS VRESTRTS-- ------GTVT VANHFNFWAH HGFHN-SD 163
Tr1 118  -TATFNQYIS VRNSPR-T-S ------GTVT VQNHFN-WAS LGLHLGQM 155
Ss  128  -PAAFDQYWS VRQSKVT--S ------GTIT TGNHFDAWAR AGMNMGNF 168
S1B 130  TR-TFDQYWS VRQSKR-TG- ------GTIT TGNHFDAWAR AGMPLGNF 168
S1C 128  TK-TFQQYWS VRQSKVTSGS ------GTIT TGNHFDAWAR AGMNMGQF 168
Tf  128  TR-TFDQYWS VRQSKRTS-- ------GTIT AGNHFDAWAR HGMHLGTH 166
Bc  121  DRTTFTQYWS VRQSKRPTGS N-----ATIT FTNHVNAWKS HGMNLGSN 163
Bs  121  DRTTFTQYWS VRQSKRPTGS N-----ATIT FSNHVNAWKS HGMNLGSN 163
```

FIGURE 1 CONT'D

```
Bp    175   MYETAFTVEG  YQSSGSANVM  TNQLFIGN          201   SEQ ID NO:4
Ca    207   MHETAFNIEG  YQSSGKADVN  SMSINIGK          233   SEQ ID NO:6
Cs    178   MYEVALTVEG  YQSSGYANVY  KNEIRIGANP....          SEQ ID NO:7
Rf    188   LYEVSLNIEG  YRSNGSANVK  SVSV              211   SEQ ID NO:8
Tr2   169   MDYQIVAVEG  YFSSGSASI-  TVS               190   SEQ ID NO:16
Tv    169   MDYQIVAVEG  YFSSGSASI-  TVS               190   SEQ ID NO:17
Th    169   MDYQIVAVEG  YFSSGSASI-  TVS               190   SEQ ID NO:14
Sc    176   HNYQIVATEG  YQSSGTATI-  TVT               197   SEQ ID NO:9
An    163   FNYQVMAVEA  WSGAGSASV-  TISS              184   SEQ ID NO:1
At    164   FNYQVVAVEA  WSGAGSAAV-  TISS              185   SEQ ID NO:2
Tr1   157   MNYQVVAVEG  WGGSGSASQ-  SVSN              178   SEQ ID NO:15
Ss    167   RYYMINATEG  YQSSGSSTI-  TVSG              189   SEQ ID NO:12
S1B   169   SYYMINATEG  YQSSGTSSI-  NVGG..........          SEQ ID NO:10
S1C   169   RYYMINATEG  YQSSGSSNI-  TVSG              191   SEQ ID NO:11
Tf    167   D-YMIMATEG  YQSSGSSNVT  LGTS..........          SEQ ID NO:13
Bc    164   WAYQVMATEG  YQSSGSSNV-  TVW               185   SEQ ID NO:3
Bs    164   WAYQVMATEG  YQSSGSSNV-  TVW               185   SEQ ID NO:5
```

FIGURE 1 CONT'D

```
                                              |                          st
                                  5'-CT AGC TAA GGA GG CTG CAG ATG
                                        G ATT CCT CC GAC GTC TAC
                                       NheI |              PstI

TrX-1
     1   2   3   4   5   6   7   8   9  10  11  12  13  14  15  16
     Q   T   I   Q   P   G   T   G   Y   N   N   G   Y   F   Y   S
    CAA ACA ATA CAA CCA GGA ACC GGT TAC AAC AAC GGT TAC TTT TAC AGC
    GTT TGT TAT GTT GGT CCT TGG CCA ATG TTG TTG CCA ATG AAA ATG TCG
                TrX-8            AgeI                    |

|          XyTv-2
    17  18  19  20  21  22  23  24  25  26  27  28  29  30  31  32
     Y   W   N   D   G   H   G   G   V   T   Y   T   N   G   P   G
    TAT TGG AAC GAT GGC CAT GGT GGT GTT ACC TAT ACA AAC GGG CCC GGA
    ATA ACC TTG CTA CCG GTA CCA CCA CAA TGG ATA TGT TTG CCC GGG CCT
                        NcoI                       XyTv-7    ApaI

|
    33  34  35  36  37  38  39  40  41  42  43  44  45  46  47  48
     G   Q   F   S   V   N   W   S   N   S   G   N   F   V   G   G
    GGC CAA TTT AGC GTC AAT TGG TCT AAC TCC GGA AAC TTC GTA GGT GGA
    CCG GTT AAA TCG CAG TTA ACC AGA TTG AGG CCT TTG AAG CAT CCA CCT
                            MunI |           BspEI

TrX-3
    49  50  51  52  53  54  55  56  57  58  59  60  61  62  63  64
     K   G   W   Q   P   G   T   K   N   K   V   I   N   F   S   G
    AAA GGT TGG CAA CCC GGG ACC AAA AAT AAG GTG ATC AAC TTC TCT GGA
    TTT CCA ACC GTT GGG CCC TGG TTT TTA TTC CAC TAG TTG AAG AGA CCT
                        XmaI                              TrX-6

|
    65  66  67  68  69  70  71  72  73  74  75  76  77  78  79  80
     S   Y   N   P   N   G   N   S   Y   L   S   V   Y   G   W   S
    TCT TAT AAT CCG AAT GGG AAT TCA TAC TTA AGC GTC TAT GGC TGG TCT
    AGA ATA TTA GGC TTA CCC TTA AGT ATG AAT TCG CAG ATA CCG ACC AGA
      |                       EcoRI         AflII

XyTv-4                                                    |
    81  82  83  84  85  86  87  88  89  90  91  92  93  94  95
     R   N   P   L   I   E   Y   Y   I   V   E   N   F   G   T
    AGA AAC CCA CTG ATT GAA TAT TAC ATT GTC GAA AAT TTC GGT AC
    TCT TTG GGT GAC TAA CTT ATA ATG TAA CAG CTT TTA AAG C
    XbaI            XyTv-5                                | KpnI
```

FIG. 2

```
                                              XyTv-101
        92  93  94  95  96  97   98  99 100 101 102 103 104 105
     V   D   N   F   G   T   Y   N   P   S   T   G   A   T   K   L
   TC GAC AAT TTC GGT ACC TAC AAT CCG AGT ACC GGC GCC ACA AAA TTA
      G  TTA AAG CCA TGG ATG TTA GGC TCA TGG CCG CGG TGT TTT AAT
   SalI  |       KpnI              XyTv-110  KasI/NarI

XyTv-102
   106 107 108 109 110 111 112 113 114 115 116 117 118 119 120 121
    G   E   V   T   S   D   G   S   V   Y   D   I   Y   R   T   Q
   GGC GAA GTC ACT AGT GAT GGA TCC GTA TAT GAT ATC TAC CGT ACC CAA
   CCG CTT CAG TGA TCA CTA CCT AGG CAT ATA CTA TAG ATG GCA TGG GTT
                 SpeI        BamHI       |                XyTv-109

|                    TrX-103
   122 123 124 125 126 127 128 129 130 131 132 133 134 135 136 137
    R   V   N   Q   P   S   I   I   G   T   A   T   F   Y   Q   Y
   CGC GTT AAT CAG CCA TCG ATC ATT GGA ACC GCC ACC TTT TAT CAG TAC
   GCG CAA TTA GTC GGT AGC TAG TAA CCT TGG CGG TGG AAA ATA GTC ATG
   MluI                   ClaI                              |

|
   138 139 140 141 142 143 144 145 146 147 148 149 150 151 152 153
    W   S   V   R   R   N   H   R   S   S   G   S   V   N   T   A
   TGG AGT GTT AGA CGT AAT CAT CGG AGC TCC GGT TCG GTT AAT ACT GCG
   ACC TCA CAA TCT GCA TTA GTA GCC TCG AGG CCA AGC CAA TTA TGA CGC
         TrX-108                      SacI                        |

XyTv-104
   154 155 156 157 158 159 160 161 162 163 164 165 166 167 168 169
    N   H   F   N   A   W   A   Q   Q   G   L   T   L   G   T   M
   AAT CAC TTT AAT GCA TGG GCA CAG CAA GGG TTA ACC CTA GGT ACA ATG
   TTA GTG AAA TTA CGT ACC CGT GTC GTT CCC AAT TGG GAT CCA TGT TAC
                   NsiI      XyTv-107                AvrII

XyTv-105
   170 171 172 173 174 175 176 177 178 179 180 181 182 183 184 185
    D   Y   Q   I   V   A   V   E   G   Y   F   S   S   G   S   A
   GAT TAT CAA ATC GTA GCG GTG GAA GGC TAC TTC TCG AGT GGT TCC GCT
   CTA ATA GTT TAG CAT CGC CAC CTT CCG ATG AAG AGC TCA CCA AGG CGA
                              |      XyTv-106         XhoI 186 187 188 189 190
    S   I   T   V   S
   AGT ATT ACA GTG AGC TAA A
   TCA TAA TGT CAC TCG ATT TCT AG
                           BglII |
```

FIG. 2 (CONT'D)

SEQUENCE LISTING

```
<160> NUMBER OF SEQ ID NOS: 65

<210> SEQ ID NO 1
<211> LENGTH: 184
<212> TYPE: PRT
<213> ORGANISM: Aspergillus niger

<400> SEQUENCE: 1

Ser Ala Gly Ile Asn Tyr Val Gln Asn Tyr Asn Gly Asn Leu Gly Asp
 1               5                  10                  15

Phe Thr Tyr Asp Glu Ser Ala Gly Thr Phe Ser Met Tyr Trp Glu Asp
                20                  25                  30

Gly Val Ser Ser Asp Phe Val Val Gly Leu Gly Trp Thr Thr Gly Ser
            35                  40                  45

Ser Asn Ala Ile Thr Tyr Ser Ala Glu Tyr Ser Ala Ser Gly Ser Ser
        50                  55                  60

Ser Tyr Leu Ala Val Tyr Gly Trp Val Asn Tyr Pro Gly Ala Glu Tyr
 65                  70                  75                  80

Tyr Ile Val Glu Asp Tyr Gly Asp Tyr Asn Pro Cys Ser Ser Ala Thr
                85                  90                  95

Ser Leu Gly Thr Val Tyr Ser Asp Gly Ser Thr Tyr Gln Val Cys Thr
            100                 105                 110

Asp Thr Arg Ile Asn Glu Pro Ser Ile Thr Gly Thr Ser Thr Phe Thr
        115                 120                 125

Gln Tyr Phe Ser Val Arg Glu Ser Thr Arg Thr Ser Gly Thr Val Thr
    130                 135                 140

Val Ala Asn His Phe Asn Phe Trp Ala Gln His Gly Phe Gly Asn Ser
145                 150                 155                 160

Asp Phe Asn Tyr Gln Val Met Ala Val Glu Ala Trp Ser Gly Ala Gly
                165                 170                 175

Ser Ala Ser Val Thr Ile Ser Ser
            180

<210> SEQ ID NO 2
<211> LENGTH: 185
<212> TYPE: PRT
```

<213> ORGANISM: Aspergillus tubingensis

<400> SEQUENCE: 2

```
Ser Ala Gly Ile Asn Tyr Val Gln Asn Tyr Asn Gln Asn Leu Gly Asp
 1               5                  10                  15

Phe Thr Tyr Asp Glu Ser Ala Gly Thr Phe Ser Met Tyr Trp Glu Asp
             20                  25                  30

Gly Val Ser Ser Asp Phe Val Val Gly Leu Gly Gly Trp Thr Thr Gly
         35                  40                  45

Ser Ser Asn Ala Ile Thr Tyr Ser Ala Glu Tyr Ser Ala Ser Gly Ser
     50                  55                  60

Ala Ser Tyr Leu Ala Val Tyr Gly Trp Val Asn Tyr Pro Gln Ala Glu
 65                  70                  75                  80

Tyr Tyr Ile Val Glu Asp Tyr Gly Asp Tyr Asn Pro Cys Ser Ser Ala
                 85                  90                  95

Thr Ser Leu Gly Thr Val Tyr Ser Asp Gly Ser Thr Tyr Gln Val Cys
            100                 105                 110

Thr Asp Thr Arg Ile Asn Glu Pro Ser Ile Thr Gly Thr Ser Thr Phe
        115                 120                 125

Thr Gln Tyr Phe Ser Val Arg Glu Ser Thr Arg Thr Ser Gly Thr Val
    130                 135                 140

Thr Val Ala Asn His Phe Asn Phe Trp Ala His His Gly Phe His Asn
145                 150                 155                 160

Ser Asp Phe Asn Tyr Gln Val Val Ala Val Glu Ala Trp Ser Gly Ala
                165                 170                 175

Gly Ser Ala Ala Val Thr Ile Ser Ser
            180                 185
```

<210> SEQ ID NO 3
<211> LENGTH: 185
<212> TYPE: PRT
<213> ORGANISM: Bacillus circulans

<400> SEQUENCE: 3

```
Ala Ser Thr Asp Tyr Trp Gln Asn Trp Thr Asp Gly Gly Gly Ile Val
 1               5                  10                  15

Asn Ala Val Asn Gly Ser Gly Gly Asn Tyr Ser Val Asn Trp Ser Asn
             20                  25                  30

Thr Gly Asn Phe Val Val Gly Lys Gly Trp Thr Thr Gly Ser Pro Phe
         35                  40                  45

Arg Thr Ile Asn Tyr Asn Ala Gly Val Trp Ala Pro Asn Gly Asn Gly
     50                  55                  60

Tyr Leu Thr Leu Tyr Gly Trp Thr Arg Ser Pro Leu Ile Glu Tyr Tyr
 65                  70                  75                  80

Val Val Asp Ser Trp Gly Thr Tyr Arg Pro Thr Gly Thr Tyr Lys Gly
                 85                  90                  95

Thr Val Lys Ser Asp Gly Gly Thr Tyr Asp Ile Tyr Thr Thr Thr Arg
            100                 105                 110

Tyr Asn Ala Pro Ser Ile Asp Gly Asp Arg Thr Thr Phe Thr Gln Tyr
        115                 120                 125

Trp Ser Val Arg Gln Ser Lys Arg Pro Thr Gly Ser Asn Ala Thr Ile
    130                 135                 140

Thr Phe Thr Asn His Val Asn Ala Trp Lys Ser His Gly Met Asn Leu
145                 150                 155                 160

Gly Ser Asn Trp Ala Tyr Gln Val Met Ala Thr Glu Gly Tyr Gln Ser
```

```
            165                 170                 175
Ser Gly Ser Ser Asn Val Thr Val Trp
        180                 185

<210> SEQ ID NO 4
<211> LENGTH: 201
<212> TYPE: PRT
<213> ORGANISM: Bacillus pumilus

<400> SEQUENCE: 4

Arg Thr Ile Thr Asn Asn Glu Met Gly Asn His Ser Gly Tyr Asp Tyr
1               5                   10                  15

Glu Leu Trp Lys Asp Tyr Gly Asn Thr Ser Met Thr Leu Asn Asn Gly
            20                  25                  30

Gly Ala Phe Ser Ala Gly Trp Asn Asn Ile Gly Asn Ala Leu Phe Arg
        35                  40                  45

Lys Gly Lys Lys Phe Asp Ser Thr Arg Thr His Gln Leu Gly Asn
    50                  55                  60

Ile Ser Ile Asn Tyr Asn Ala Ser Phe Asn Pro Ser Gly Asn Ser Tyr
65                  70                  75                  80

Leu Cys Val Tyr Gly Trp Thr Gln Ser Pro Leu Ala Glu Tyr Tyr Ile
                85                  90                  95

Val Asp Ser Trp Gly Thr Tyr Arg Pro Thr Gly Ala Tyr Lys Gly Ser
            100                 105                 110

Phe Tyr Ala Asp Gly Gly Thr Tyr Asp Ile Tyr Glu Thr Thr Arg Val
        115                 120                 125

Asn Gln Pro Ser Ile Ile Gly Ile Ala Thr Phe Lys Gln Tyr Trp Ser
    130                 135                 140

Val Arg Gln Thr Lys Arg Thr Ser Gly Thr Val Ser Val Ser Ala His
145                 150                 155                 160

Phe Arg Lys Trp Glu Ser Leu Gly Met Pro Met Gly Lys Met Tyr Glu
                165                 170                 175

Thr Ala Phe Thr Val Glu Gly Tyr Gln Ser Ser Gly Ser Ala Asn Val
            180                 185                 190

Met Thr Asn Gln Leu Phe Ile Gly Asn
        195                 200

<210> SEQ ID NO 5
<211> LENGTH: 185
<212> TYPE: PRT
<213> ORGANISM: Bacillus subtilis

<400> SEQUENCE: 5

Ala Ser Thr Asp Tyr Trp Gln Asn Trp Thr Asp Gly Gly Gly Ile Val
1               5                   10                  15

Asn Ala Val Asn Gly Ser Gly Gly Asn Tyr Ser Val Asn Trp Ser Asn
            20                  25                  30

Thr Gly Asn Phe Val Val Gly Lys Gly Trp Thr Thr Gly Ser Pro Phe
        35                  40                  45

Arg Thr Ile Asn Tyr Asn Ala Gly Val Trp Ala Pro Asn Gly Asn Gly
    50                  55                  60

Tyr Leu Thr Leu Tyr Gly Trp Thr Arg Ser Pro Leu Ile Glu Tyr Tyr
65                  70                  75                  80

Val Val Asp Ser Trp Gly Thr Tyr Arg Pro Thr Gly Thr Tyr Lys Gly
                85                  90                  95

Thr Val Lys Ser Asp Gly Gly Thr Tyr Asp Ile Tyr Thr Thr Thr Arg
```

```
                100                 105                 110
Tyr Asn Ala Pro Ser Ile Asp Gly Asp Arg Thr Thr Phe Thr Gln Tyr
            115                 120                 125

Trp Ser Val Arg Gln Ser Lys Arg Pro Thr Gly Ser Asn Ala Thr Ile
130                 135                 140

Thr Phe Ser Asn His Val Asn Ala Trp Lys Ser His Gly Met Asn Leu
145                 150                 155                 160

Gly Ser Asn Trp Ala Tyr Gln Val Met Ala Thr Glu Gly Tyr Gln Ser
                165                 170                 175

Ser Gly Ser Ser Asn Val Thr Val Trp
            180                 185

<210> SEQ ID NO 6
<211> LENGTH: 211
<212> TYPE: PRT
<213> ORGANISM: Clostridium acetobutylicum

<400> SEQUENCE: 6

Ser Ala Phe Asn Thr Gln Ala Ala Pro Lys Thr Ile Thr Ser Asn Glu
1               5                   10                  15

Ile Gly Val Asn Gly Gly Tyr Asp Tyr Glu Leu Trp Lys Asp Tyr Gly
            20                  25                  30

Asn Thr Ser Met Thr Leu Lys Asn Gly Gly Ala Phe Ser Cys Gln Trp
        35                  40                  45

Ser Asn Ile Gly Asn Ala Leu Phe Arg Lys Gly Lys Lys Phe Asn Asp
    50                  55                  60

Thr Gln Thr Tyr Lys Gln Leu Gly Asn Ile Ser Val Asn Tyr Asn Cys
65                  70                  75                  80

Asn Tyr Gln Pro Tyr Gly Asn Ser Tyr Leu Cys Val Tyr Gly Trp Thr
                85                  90                  95

Ser Ser Pro Leu Val Glu Tyr Tyr Ile Val Asp Ser Trp Gly Ser Trp
            100                 105                 110

Arg Pro Pro Gly Gly Thr Ser Lys Gly Thr Ile Thr Val Asp Gly Gly
        115                 120                 125

Ile Tyr Asp Ile Tyr Glu Thr Thr Arg Ile Asn Gln Pro Ser Ile Gln
    130                 135                 140

Gly Asn Thr Thr Phe Lys Gln Tyr Trp Ser Val Arg Arg Thr Lys Arg
145                 150                 155                 160

Thr Ser Gly Thr Ile Ser Val Ser Lys His Phe Ala Ala Trp Glu Ser
                165                 170                 175

Lys Gly Met Pro Leu Gly Lys Met His Glu Thr Ala Phe Asn Ile Glu
            180                 185                 190

Gly Tyr Gln Ser Ser Gly Lys Ala Asp Val Asn Ser Met Ser Ile Asn
        195                 200                 205

Ile Gly Lys
    210

<210> SEQ ID NO 7
<211> LENGTH: 206
<212> TYPE: PRT
<213> ORGANISM: Clostridium stercorarium

<400> SEQUENCE: 7

Gly Arg Ile Ile Tyr Asp Asn Glu Thr Gly Thr His Gly Gly Tyr Asp
1               5                   10                  15

Tyr Glu Leu Trp Lys Asp Tyr Gly Asn Thr Ile Met Glu Leu Asn Asp
```

```
                    20                      25                      30
Gly Gly Thr Phe Ser Cys Gln Trp Ser Asn Ile Gly Asn Ala Leu Phe
        35                      40                      45

Arg Lys Gly Arg Lys Phe Asn Ser Asp Lys Thr Tyr Gln Glu Leu Gly
    50                      55                      60

Asp Ile Val Val Glu Tyr Gly Cys Asp Tyr Asn Pro Asn Gly Asn Ser
65                      70                      75                  80

Tyr Leu Cys Val Tyr Gly Trp Thr Arg Asn Phe Leu Val Glu Tyr Tyr
                    85                      90                      95

Ile Val Glu Ser Trp Gly Ser Trp Arg Pro Pro Gly Ala Thr Pro Lys
                100                     105                     110

Gly Thr Ile Thr Gln Trp Met Ala Gly Thr Tyr Glu Ile Tyr Glu Thr
            115                     120                     125

Thr Arg Val Asn Gln Pro Ser Ile Asp Gly Thr Ala Thr Phe Gln Gln
        130                     135                     140

Tyr Trp Ser Val Arg Thr Ser Lys Arg Thr Gly Thr Ile Ser Val
145                     150                     155                 160

Thr Glu His Phe Lys Gln Trp Glu Arg Met Gly Met Arg Met Gly Lys
                    165                     170                     175

Met Tyr Glu Val Ala Leu Thr Val Glu Gly Tyr Gln Ser Ser Gly Tyr
                180                     185                     190

Ala Asn Val Tyr Lys Asn Glu Ile Arg Ile Gly Ala Asn Pro
                195                     200                     205

<210> SEQ ID NO 8
<211> LENGTH: 211
<212> TYPE: PRT
<213> ORGANISM: Ruminococcus flavefaciens

<400> SEQUENCE: 8

Ser Ala Ala Asp Gln Gln Thr Arg Gly Asn Val Gly Gly Tyr Asp Tyr
1               5                   10                      15

Glu Met Trp Asn Gln Asn Gly Gln Gly Gln Ala Ser Met Asn Pro Gly
                    20                      25                      30

Ala Gly Ser Phe Thr Cys Ser Trp Ser Asn Ile Glu Asn Phe Leu Ala
            35                      40                      45

Arg Met Gly Lys Asn Tyr Asp Ser Gln Lys Lys Asn Tyr Lys Ala Phe
        50                      55                      60

Gly Asn Ile Val Leu Thr Tyr Asp Val Glu Tyr Thr Pro Arg Gly Asn
65                      70                      75                  80

Ser Tyr Met Cys Val Tyr Gly Trp Thr Arg Asn Pro Leu Met Glu Tyr
                    85                      90                      95

Tyr Ile Val Glu Gly Trp Gly Asp Trp Arg Pro Pro Gly Asn Asp Gly
                100                     105                     110

Glu Val Lys Gly Thr Val Ser Ala Asn Gly Asn Thr Tyr Asp Ile Arg
            115                     120                     125

Lys Thr Met Arg Tyr Asn Gln Pro Ser Leu Asp Gly Thr Ala Thr Phe
        130                     135                     140

Pro Gln Tyr Trp Ser Val Arg Gln Thr Ser Gly Ser Ala Asn Asn Gln
145                     150                     155                 160

Thr Asn Tyr Met Lys Gly Thr Ile Asp Val Ser Lys His Phe Asp Ala
                    165                     170                     175

Trp Ser Ala Ala Gly Leu Asp Met Ser Gly Thr Leu Tyr Glu Val Ser
                180                     185                     190
```

-continued

```
Leu Asn Ile Glu Gly Tyr Arg Ser Asn Gly Ser Ala Asn Val Lys Ser
        195                 200                 205
Val Ser Val
    210

<210> SEQ ID NO 9
<211> LENGTH: 197
<212> TYPE: PRT
<213> ORGANISM: Schizophyllum commune

<400> SEQUENCE: 9

Ser Gly Thr Pro Ser Ser Thr Gly Thr Asp Gly Gly Tyr Tyr Tyr Ser
  1               5                  10                  15
Trp Trp Thr Asp Gly Ala Gly Asp Ala Thr Tyr Gln Asn Asn Gly Gly
             20                  25                  30
Gly Ser Tyr Thr Leu Thr Trp Ser Gly Asn Asn Gly Asn Leu Val Gly
         35                  40                  45
Gly Lys Gly Trp Asn Pro Gly Ala Ala Ser Arg Ser Ile Ser Tyr Ser
     50                  55                  60
Gly Thr Tyr Gln Pro Asn Gly Asn Ser Tyr Leu Ser Val Tyr Gly Trp
 65                  70                  75                  80
Thr Arg Ser Ser Leu Ile Glu Tyr Tyr Ile Val Glu Ser Tyr Gly Ser
                 85                  90                  95
Tyr Asp Pro Ser Ser Ala Ala Ser His Lys Gly Ser Val Thr Cys Asn
            100                 105                 110
Gly Ala Thr Tyr Asp Ile Leu Ser Thr Trp Arg Tyr Asn Ala Pro Ser
        115                 120                 125
Ile Asp Gly Thr Gln Thr Phe Glu Gln Phe Trp Ser Val Arg Asn Pro
    130                 135                 140
Lys Lys Ala Pro Gly Gly Ser Ile Ser Gly Thr Val Asp Val Gln Cys
145                 150                 155                 160
His Phe Asp Ala Trp Lys Gly Leu Gly Met Asn Leu Gly Ser Glu His
                165                 170                 175
Asn Tyr Gln Ile Val Ala Thr Glu Gly Tyr Gln Ser Ser Gly Thr Ala
            180                 185                 190
Thr Ile Thr Val Thr
        195

<210> SEQ ID NO 10
<211> LENGTH: 191
<212> TYPE: PRT
<213> ORGANISM: Streptomyces lividans

<400> SEQUENCE: 10

Asp Thr Val Val Thr Thr Asn Gln Glu Gly Thr Asn Asn Gly Tyr Tyr
  1               5                  10                  15
Tyr Ser Phe Trp Thr Asp Ser Gln Gly Thr Val Ser Met Asn Met Gly
             20                  25                  30
Ser Gly Gly Gln Tyr Ser Thr Ser Trp Arg Asn Thr Gly Asn Phe Val
         35                  40                  45
Ala Gly Lys Gly Trp Ala Asn Gly Gly Arg Arg Thr Val Gln Tyr Ser
     50                  55                  60
Gly Ser Phe Asn Pro Ser Gly Asn Ala Tyr Leu Ala Leu Tyr Gly Trp
 65                  70                  75                  80
Thr Ser Asn Pro Leu Val Glu Tyr Tyr Ile Val Asp Asn Trp Gly Thr
                 85                  90                  95
```

```
Tyr Arg Pro Thr Gly Glu Tyr Lys Gly Thr Val Thr Ser Asp Gly Gly
            100                 105                 110

Thr Tyr Asp Ile Tyr Lys Thr Arg Val Asn Lys Pro Ser Val Glu
        115                 120                 125

Gly Thr Arg Thr Phe Asp Gln Tyr Trp Ser Val Arg Gln Ser Lys Arg
    130                 135                 140

Thr Gly Gly Thr Ile Thr Thr Gly Asn His Phe Asp Ala Trp Ala Arg
145                 150                 155                 160

Ala Gly Met Pro Leu Gly Asn Phe Ser Tyr Tyr Met Ile Asn Ala Thr
            165                 170                 175

Glu Gly Tyr Gln Ser Ser Gly Thr Ser Ser Ile Asn Val Gly Gly
            180                 185                 190
```

<210> SEQ ID NO 11
<211> LENGTH: 191
<212> TYPE: PRT
<213> ORGANISM: Streptomyces lividans

<400> SEQUENCE: 11

```
Ala Thr Thr Ile Thr Thr Asn Gln Thr Gly Thr Asp Gly Met Tyr Tyr
1               5                   10                  15

Ser Phe Trp Thr Asp Gly Gly Ser Val Ser Met Thr Leu Asn Gly
            20                  25                  30

Gly Gly Ser Tyr Ser Thr Gln Trp Thr Asn Cys Gly Asn Phe Val Ala
        35                  40                  45

Gly Lys Gly Trp Ser Thr Gly Asp Gly Asn Val Arg Tyr Asn Gly Tyr
    50                  55                  60

Phe Asn Pro Val Gly Asn Gly Tyr Gly Cys Leu Tyr Gly Trp Thr Ser
65                  70                  75                  80

Asn Pro Leu Val Glu Tyr Tyr Ile Val Asp Asn Trp Gly Ser Tyr Arg
            85                  90                  95

Pro Thr Gly Thr Tyr Lys Gly Thr Val Ser Ser Asp Gly Gly Thr Tyr
            100                 105                 110

Asp Ile Tyr Gln Thr Thr Arg Tyr Asn Ala Pro Ser Val Glu Gly Thr
        115                 120                 125

Lys Thr Phe Gln Gln Tyr Trp Ser Val Arg Gln Ser Lys Val Thr Ser
    130                 135                 140

Gly Ser Gly Thr Ile Thr Thr Gly Asn His Phe Asp Ala Trp Ala Arg
145                 150                 155                 160

Ala Gly Met Asn Met Gly Gln Phe Arg Tyr Tyr Met Ile Asn Ala Thr
            165                 170                 175

Glu Gly Tyr Gln Ser Ser Gly Ser Ser Asn Ile Thr Val Ser Gly
            180                 185                 190
```

<210> SEQ ID NO 12
<211> LENGTH: 189
<212> TYPE: PRT
<213> ORGANISM: Streptomyces sp.

<400> SEQUENCE: 12

```
Ala Thr Thr Ile Thr Asn Glu Thr Gly Tyr Asp Gly Met Tyr Tyr Ser
1               5                   10                  15

Phe Trp Thr Asp Gly Gly Ser Val Ser Met Thr Leu Asn Gly Gly
            20                  25                  30

Gly Ser Tyr Ser Thr Arg Trp Thr Asn Cys Gly Asn Phe Val Ala Gly
        35                  40                  45
```

-continued

```
Lys Gly Trp Ala Asn Gly Gly Arg Arg Thr Val Arg Tyr Thr Gly Trp
 50                  55                  60

Phe Asn Pro Ser Gly Asn Gly Tyr Gly Cys Leu Tyr Gly Trp Thr Ser
 65                  70                  75                  80

Asn Pro Leu Val Glu Tyr Tyr Ile Val Asp Asn Trp Gly Ser Tyr Arg
                 85                  90                  95

Pro Thr Gly Glu Thr Arg Gly Thr Val His Ser Asp Gly Gly Thr Tyr
            100                 105                 110

Asp Ile Tyr Lys Thr Thr Arg Tyr Asn Ala Pro Ser Val Glu Ala Pro
        115                 120                 125

Ala Ala Phe Asp Gln Tyr Trp Ser Val Arg Gln Ser Lys Val Thr Ser
130                 135                 140

Gly Thr Ile Thr Thr Gly Asn His Phe Asp Ala Trp Ala Arg Ala Gly
145                 150                 155                 160

Met Asn Met Gly Asn Phe Arg Tyr Tyr Met Ile Asn Ala Thr Glu Gly
                165                 170                 175

Tyr Gln Ser Ser Gly Ser Ser Thr Ile Thr Val Ser Gly
            180                 185
```

<210> SEQ ID NO 13
<211> LENGTH: 189
<212> TYPE: PRT
<213> ORGANISM: Thermomonospora fusca

<400> SEQUENCE: 13

```
Ala Val Thr Ser Asn Glu Thr Gly Tyr His Asp Gly Tyr Phe Tyr Ser
 1               5                  10                  15

Phe Trp Thr Asp Ala Pro Gly Thr Val Ser Met Glu Leu Gly Pro Gly
                 20                  25                  30

Gly Asn Tyr Ser Thr Ser Trp Arg Asn Thr Gly Asn Phe Val Ala Gly
            35                  40                  45

Lys Gly Trp Ala Thr Gly Gly Arg Arg Thr Val Thr Tyr Ser Ala Ser
 50                  55                  60

Phe Asn Pro Ser Gly Asn Ala Tyr Leu Thr Leu Tyr Gly Trp Thr Arg
 65                  70                  75                  80

Asn Pro Leu Val Glu Tyr Tyr Ile Val Glu Ser Trp Gly Thr Tyr Arg
                 85                  90                  95

Pro Thr Gly Thr Tyr Met Gly Thr Val Thr Thr Asp Gly Gly Thr Tyr
            100                 105                 110

Asp Ile Tyr Lys Thr Thr Arg Tyr Asn Ala Pro Ser Ile Glu Gly Thr
        115                 120                 125

Arg Thr Phe Asp Gln Tyr Trp Ser Val Arg Gln Ser Lys Arg Thr Ser
130                 135                 140

Gly Thr Ile Thr Ala Gly Asn His Phe Asp Ala Trp Ala Arg His Gly
145                 150                 155                 160

Met His Leu Gly Thr His Asp Tyr Met Ile Met Ala Thr Glu Gly Tyr
                165                 170                 175

Gln Ser Ser Gly Ser Ser Asn Val Thr Leu Gly Thr Ser
            180                 185
```

<210> SEQ ID NO 14
<211> LENGTH: 190
<212> TYPE: PRT
<213> ORGANISM: Trichoderma harzianum

<400> SEQUENCE: 14

```
Gln Thr Ile Gly Pro Gly Thr Gly Tyr Ser Asn Gly Tyr Tyr Tyr Ser
  1               5                  10                  15

Tyr Trp Asn Asp Gly His Ala Gly Val Thr Tyr Thr Asn Gly Gly Gly
             20                  25                  30

Gly Ser Phe Thr Val Asn Trp Ser Asn Ser Gly Asn Phe Val Gly Gly
             35                  40                  45

Lys Gly Trp Gln Pro Gly Thr Lys Asn Lys Val Ile Asn Phe Ser Gly
 50                  55                  60

Ser Tyr Asn Pro Asn Gly Asn Ser Tyr Leu Ser Ile Tyr Gly Trp Ser
 65                  70                  75                  80

Arg Asn Pro Leu Ile Glu Tyr Tyr Ile Val Glu Asn Phe Gly Thr Tyr
             85                  90                  95

Asn Pro Ser Thr Gly Ala Thr Lys Leu Gly Glu Val Thr Ser Asp Gly
            100                 105                 110

Ser Val Tyr Asp Ile Tyr Arg Thr Gln Arg Val Asn Gln Pro Ser Ile
            115                 120                 125

Ile Gly Thr Ala Thr Phe Tyr Gln Tyr Trp Ser Val Arg Arg Asn His
130                 135                 140

Arg Ser Ser Gly Ser Val Asn Thr Ala Asn His Phe Asn Ala Trp Ala
145                 150                 155                 160

Ser His Gly Leu Thr Leu Gly Thr Met Asp Tyr Gln Ile Val Ala Val
            165                 170                 175

Glu Gly Tyr Phe Ser Ser Gly Ser Ala Ser Ile Thr Val Ser
            180                 185                 190

<210> SEQ ID NO 15
<211> LENGTH: 178
<212> TYPE: PRT
<213> ORGANISM: Trichoderma reesei

<400> SEQUENCE: 15

Ala Ser Ile Asn Tyr Asp Gln Asn Tyr Gln Thr Gly Gly Gln Val Ser
  1               5                  10                  15

Tyr Ser Pro Ser Asn Thr Gly Phe Ser Val Asn Trp Asn Thr Gln Asp
             20                  25                  30

Asp Phe Val Val Gly Val Gly Trp Thr Thr Gly Ser Ser Ala Pro Ile
             35                  40                  45

Asn Phe Gly Gly Ser Phe Ser Val Asn Ser Gly Thr Gly Leu Leu Ser
 50                  55                  60

Val Tyr Gly Trp Ser Thr Asn Pro Leu Val Glu Tyr Tyr Ile Met Glu
 65                  70                  75                  80

Asp Asn His Asn Tyr Pro Ala Gln Gly Thr Val Lys Gly Thr Val Thr
             85                  90                  95

Ser Asp Gly Ala Thr Tyr Thr Ile Trp Glu Asn Thr Arg Val Asn Glu
            100                 105                 110

Pro Ser Ile Gln Gly Thr Ala Thr Phe Asn Gln Tyr Ile Ser Val Arg
            115                 120                 125

Asn Ser Pro Arg Thr Ser Gly Thr Val Thr Val Gln Asn His Phe Asn
130                 135                 140

Trp Ala Ser Leu Gly Leu His Leu Gly Gln Met Met Asn Tyr Gln Val
145                 150                 155                 160

Val Ala Val Glu Gly Trp Gly Gly Ser Gly Ser Ala Ser Gln Ser Val
            165                 170                 175

Ser Asn
```

```
<210> SEQ ID NO 16
<211> LENGTH: 190
<212> TYPE: PRT
<213> ORGANISM: Trichoderma reesei

<400> SEQUENCE: 16

Gln Thr Ile Gln Pro Gly Thr Gly Tyr Asn Asn Gly Tyr Phe Tyr Ser
  1               5                  10                  15

Tyr Trp Asn Asp Gly His Gly Gly Val Thr Tyr Thr Asn Gly Pro Gly
                 20                  25                  30

Gly Gln Phe Ser Val Asn Trp Ser Asn Ser Gly Asn Phe Val Gly Gly
             35                  40                  45

Lys Gly Trp Gln Pro Gly Thr Lys Asn Lys Val Ile Asn Phe Ser Gly
 50                  55                  60

Ser Tyr Asn Pro Asn Gly Asn Ser Tyr Leu Ser Val Tyr Gly Trp Ser
 65                  70                  75                  80

Arg Asn Pro Leu Ile Glu Tyr Tyr Ile Val Glu Asn Phe Gly Thr Tyr
                 85                  90                  95

Asn Pro Ser Thr Gly Ala Thr Lys Leu Gly Glu Val Thr Ser Asp Gly
            100                 105                 110

Ser Val Tyr Asp Ile Tyr Arg Thr Gln Arg Val Asn Gln Pro Ser Ile
            115                 120                 125

Ile Gly Thr Ala Thr Phe Tyr Gln Tyr Trp Ser Val Arg Arg Asn His
130                 135                 140

Arg Ser Ser Gly Ser Val Asn Thr Ala Asn His Phe Asn Ala Trp Ala
145                 150                 155                 160

Gln Gln Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
            180                 185                 190

<210> SEQ ID NO 17
<211> LENGTH: 190
<212> TYPE: PRT
<213> ORGANISM: Trichoderma viride

<400> SEQUENCE: 17

Gln Thr Ile Gln Pro Gly Thr Gly Phe Asn Asn Gly Tyr Phe Tyr Ser
  1               5                  10                  15

Tyr Trp Asn Asp Gly His Gly Gly Val Thr Tyr Thr Asn Gly Pro Gly
                 20                  25                  30

Gly Gln Phe Ser Val Asn Trp Ser Asn Ser Gly Asn Phe Val Gly Gly
             35                  40                  45

Lys Gly Trp Gln Pro Gly Thr Lys Asn Lys Val Ile Asn Phe Ser Gly
 50                  55                  60

Ser Tyr Asn Pro Asn Gly Asn Ser Tyr Leu Ser Val Tyr Gly Trp Ser
 65                  70                  75                  80

Arg Asn Pro Leu Ile Glu Tyr Tyr Ile Val Glu Asn Phe Gly Thr Tyr
                 85                  90                  95

Asn Pro Ser Thr Gly Ala Thr Lys Leu Gly Glu Val Thr Ser Asp Gly
            100                 105                 110

Ser Val Tyr Asp Ile Tyr Arg Thr Gln Arg Val Asn Gln Pro Ser Ile
            115                 120                 125

Ile Gly Thr Ala Thr Phe Tyr Gln Tyr Trp Ser Val Arg Arg Thr His
130                 135                 140
```

```
Arg Ser Ser Gly Ser Val Asn Thr Ala Asn His Phe Asn Ala Trp Ala
145                 150                 155                 160

Gln Gln Gly Leu Thr Leu Gly Thr Met Asp Tyr Gln Ile Val Ala Val
            165                 170                 175

Glu Gly Tyr Phe Ser Ser Gly Ser Ala Ser Ile Thr Val Ser
        180                 185                 190

<210> SEQ ID NO 18
<211> LENGTH: 596
<212> TYPE: DNA
<213> ORGANISM: Artificial Sequence
<220> FEATURE:
<223> OTHER INFORMATION: Description of Artificial Sequence:TrX
      synthetic sequence

<400> SEQUENCE: 18
ctagctaagg aggctgcaga tgcaaacaat acaaccagga accggttaca acaacggtta      60
cttttacagc tattggaacg atggccatgg tggtgttacc tatacaaacg ggcccggagg     120
ccaatttagc gtcaattggt ctaactccgg aaacttcgta ggtggaaaag gttggcaacc     180
cgggaccaaa aataaggtga tcaacttctc tggatcttat aatccgaatg ggaattcata     240
cttaagcgtc tatggctggt ctagaaaccc actgattgaa tattacattg tcgaaaattt     300
cggtacctac aatccgagta ccggcgccac aaaattaggc gaagtcacta gtgatggatc     360
cgtatatgat atctaccgta cccaacgcgt taatcagcca tcgatcattg gaaccgccac     420
cttttatcag tactggagtg ttagacgtaa tcatcggagc tccggttcgg ttaatactgc     480
gaatcacttt aatgcatggg cacagcaagg gttaacccta ggtacaatgg attatcaaat     540
cgtagcggtg gaaggctact ctcgagtggg ttccgctagt attacagtga gctaaa        596

<210> SEQ ID NO 19
<211> LENGTH: 40
<212> TYPE: DNA
<213> ORGANISM: Artificial Sequence
<220> FEATURE:
<223> OTHER INFORMATION: Description of Artificial Sequence:Trx-110C
      Synthetic Sequence

<400> SEQUENCE: 19
atatacggat ccatcacaag tgacttcgcc taattttgtg                            40

<210> SEQ ID NO 20
<211> LENGTH: 68
<212> TYPE: DNA
<213> ORGANISM: Artificial Sequence
<220> FEATURE:
<223> OTHER INFORMATION: Description of Artificial Sequence:Tx-110C-2

<400> SEQUENCE: 20
gcgccacaaa attaggcgaa gtcacttgtg atggatccgt atatgatatc taccgtaccc      60
aacgcgtt                                                              68

<210> SEQ ID NO 21
<211> LENGTH: 42
<212> TYPE: DNA
<213> ORGANISM: Artificial Sequence
<220> FEATURE:
<223> OTHER INFORMATION: Description of Artificial Sequence:Tx-103b

<400> SEQUENCE: 21
aatcagccat cgatcattgg aaccgccacc ttttatcagt ac                         42
```

<210> SEQ ID NO 22
<211> LENGTH: 54
<212> TYPE: DNA
<213> ORGANISM: Artificial Sequence
<220> FEATURE:
<223> OTHER INFORMATION: Description of Artificial Sequence:XyTv-109
      Synthetic sequence

<400> SEQUENCE: 22
ggtggcggtt ccaatgatcg atggctgatt aacgcgttgg gtacggtaga tatc         54

<210> SEQ ID NO 23
<211> LENGTH: 48
<212> TYPE: DNA
<213> ORGANISM: Artificial Sequence
<220> FEATURE:
<223> OTHER INFORMATION: Description of Artificial Sequence:Tx-108b

<400> SEQUENCE: 23
cgaaccggag ctccgatgat tacgtctaac actccagtac tgataaaa               48

<210> SEQ ID NO 24
<211> LENGTH: 52
<212> TYPE: DNA
<213> ORGANISM: Artificial Sequence
<220> FEATURE:
<223> OTHER INFORMATION: Description of Artificial Sequence:Tx-154C
      Synthetic sequence

<400> SEQUENCE: 24
ctagggttaa cccttgtgat gcccaggcat taaagtggca tgcagtatta ac           52

<210> SEQ ID NO 25
<211> LENGTH: 84
<212> TYPE: DNA
<213> ORGANISM: Artificial Sequence
<220> FEATURE:
<223> OTHER INFORMATION: Description of Artificial Sequence:Tx-154C-2

<400> SEQUENCE: 25
tggagtgtta gacgtaatca tcggagctcc ggttcggtta atactgcatg ccactttaat   60
gcctgggcac agcaagggtt aacc                                          84

<210> SEQ ID NO 26
<211> LENGTH: 34
<212> TYPE: DNA
<213> ORGANISM: Artificial Sequence
<220> FEATURE:
<223> OTHER INFORMATION: Description of Artificial Sequence:Tx-162H-3

<400> SEQUENCE: 26
ccacttcaat gcatgggcac agcacgggtt aacc                               34

<210> SEQ ID NO 27
<211> LENGTH: 42
<212> TYPE: DNA
<213> ORGANISM: Artificial Sequence
<220> FEATURE:
<223> OTHER INFORMATION: Description of Artificial Sequence:TrX-162H-4

<400> SEQUENCE: 27
ctagggttaa cccgtgctgt gcccatgcat tgaagtggca tg                      42

<210> SEQ ID NO 28
<211> LENGTH: 58

<212> TYPE: DNA
<213> ORGANISM: Artificial Sequence
<220> FEATURE:
<223> OTHER INFORMATION: Description of Artificial Sequence:XyTv-101

<400> SEQUENCE: 28
tcgacaattt cggtacctac aatccgagta ccggcgccac aaaattaggc gaagtcac        58

<210> SEQ ID NO 29
<211> LENGTH: 52
<212> TYPE: DNA
<213> ORGANISM: Artificial Sequence
<220> FEATURE:
<223> OTHER INFORMATION: Description of Artificial Sequence:XyTv-102

<400> SEQUENCE: 29
tagtgatgga tccgtatatg atatctaccg tacccaacgc gttaatcagc ca        52

<210> SEQ ID NO 30
<211> LENGTH: 60
<212> TYPE: DNA
<213> ORGANISM: Artificial Sequence
<220> FEATURE:
<223> OTHER INFORMATION: Description of Artificial Sequence:TrX-103

<400> SEQUENCE: 30
tcgatcattg gaaccgccac cttttatcag tactggagtg ttagacgtaa tcatcggagc        60

<210> SEQ ID NO 31
<211> LENGTH: 69
<212> TYPE: DNA
<213> ORGANISM: Artificial Sequence
<220> FEATURE:
<223> OTHER INFORMATION: Description of Artificial Sequence:XyTv-104

<400> SEQUENCE: 31
tccggttcgg ttaatactgc gaatcacttt aatgcatggg cacagcaagg gttaaccta        60 ggtacaatg        69

<210> SEQ ID NO 32
<211> LENGTH: 67
<212> TYPE: DNA
<213> ORGANISM: Artificial Sequence
<220> FEATURE:
<223> OTHER INFORMATION: Description of Artificial Sequence:XyTv-105

<400> SEQUENCE: 32
gattatcaaa tcgtagcggt ggaaggctac ttctcgagtg gttccgctag tattacagtg        60
agctaaa        67

<210> SEQ ID NO 33
<211> LENGTH: 53
<212> TYPE: DNA
<213> ORGANISM: Artificial Sequence
<220> FEATURE:
<223> OTHER INFORMATION: Description of Artificial Sequence:XyTv-106
      synthetic sequence

<400> SEQUENCE: 33
gatctttagc tcactgtaat actagcggaa ccactcgaga gtagccttc cac        53

<210> SEQ ID NO 34
<211> LENGTH: 66
<212> TYPE: DNA
<213> ORGANISM: Artificial Sequence -continued

```
<220> FEATURE:
<223> OTHER INFORMATION: Description of Artificial Sequence:XyTv-107

<400> SEQUENCE: 34
cgctacgatt tgataatcca ttgtacctag ggttaaccct tgctgtgccc atgcattaaa      60
gtgatt                                                                66

<210> SEQ ID NO 35
<211> LENGTH: 60
<212> TYPE: DNA
<213> ORGANISM: Artificial Sequence
<220> FEATURE:
<223> OTHER INFORMATION: Description of Artificial Sequence:TrX-108

<400> SEQUENCE: 35
cgcagtatta accgaaccgg agctccgatg attacgtcta acactccagt actgataaaa      60

<210> SEQ ID NO 36
<211> LENGTH: 73
<212> TYPE: DNA
<213> ORGANISM: Artificial Sequence
<220> FEATURE:
<223> OTHER INFORMATION: Description of Artificial Sequence:XyTv-110

<400> SEQUENCE: 36
atatacggat ccatcactag tgacttcgcc taattttgtg gcgccggtac tcggattgta      60
ggtaccgaaa ttg                                                        73

<210> SEQ ID NO 37
<211> LENGTH: 76
<212> TYPE: DNA
<213> ORGANISM: Artificial Sequence
<220> FEATURE:
<223> OTHER INFORMATION: Description of Artificial Sequence:TrX-1

<400> SEQUENCE: 37
ctagctaagg aggctgcaga tgcaaacaat acaaccagga accggttaca acaacggtta      60
cttttacagc tattgg                                                     76

<210> SEQ ID NO 38
<211> LENGTH: 78
<212> TYPE: DNA
<213> ORGANISM: Artificial Sequence
<220> FEATURE:
<223> OTHER INFORMATION: Description of Artificial Sequence:XyTv-2

<400> SEQUENCE: 38
aacgatggcc atggtggtgt tacctataca aacgggcccg gaggccaatt tagcgtcaat      60
tggtctaact ccggaaac                                                   78

<210> SEQ ID NO 39
<211> LENGTH: 78
<212> TYPE: DNA
<213> ORGANISM: Artificial Sequence
<220> FEATURE:
<223> OTHER INFORMATION: Description of Artificial Sequence:TrX-3

<400> SEQUENCE: 39
ttcgtaggtg aaaaggttg gcaacccggg accaaaaata aggtgatcaa cttctctgga       60
tcttataatc cgaatggg                                                   78

<210> SEQ ID NO 40
```

-continued

```
<211> LENGTH: 74
<212> TYPE: DNA
<213> ORGANISM: Artificial Sequence
<220> FEATURE:
<223> OTHER INFORMATION: Description of Artificial Sequence:XyTv-4

<400> SEQUENCE: 40
aattcatact taagcgtcta tggctggtct agaaacccac tgattgaata ttacattgtc      60
gaaaatttcg gtac                                                       74

<210> SEQ ID NO 41
<211> LENGTH: 85
<212> TYPE: DNA
<213> ORGANISM: Artificial Sequence
<220> FEATURE:
<223> OTHER INFORMATION: Description of Artificial Sequence:XyTv-5

<400> SEQUENCE: 41
gcaaattttc gacaatgtaa tattcaatca gtgggtttct agaccagcca tagacgctta     60
agtatgaatt cccattcgga ttata                                           85

<210> SEQ ID NO 42
<211> LENGTH: 78
<212> TYPE: DNA
<213> ORGANISM: Artificial Sequence
<220> FEATURE:
<223> OTHER INFORMATION: Description of Artificial Sequence:Trx-6
      Synthetic sequence

<400> SEQUENCE: 42
agatccagag aagttgatca ccttattttt ggtcccgggt tgccaacctt ttccacctac     60
gaagtttccg gagttaga                                                   78

<210> SEQ ID NO 43
<211> LENGTH: 84
<212> TYPE: DNA
<213> ORGANISM: Artificial Sequence
<220> FEATURE:
<223> OTHER INFORMATION: Description of Artificial Sequence:XyTv-7
      Synthetic sequence

<400> SEQUENCE: 43
ccaattgacg ctaaattggc ctccgggccc gtttgtatag gtaacaccac catggccatc     60
gttccaatag ctgtaaaagt aacc                                            84

<210> SEQ ID NO 44
<211> LENGTH: 51
<212> TYPE: DNA
<213> ORGANISM: Artificial Sequence
<220> FEATURE:
<223> OTHER INFORMATION: Description of Artificial Sequence:TrX-8
      synthetic sequence

<400> SEQUENCE: 44
gttgttgtaa ccggttcctg gttgtattgt ttgcatctgc agcctcctta g              51

<210> SEQ ID NO 45
<211> LENGTH: 40
<212> TYPE: DNA
<213> ORGANISM: Artificial Sequence
<220> FEATURE:
<223> OTHER INFORMATION: Description of Artificial Sequence:Tx-108C
      synthetic sequence

<400> SEQUENCE: 45
```

```
atatacggat ccatcactag tgcattcgcc taattttgtg          40

<210> SEQ ID NO 46
<211> LENGTH: 68
<212> TYPE: DNA
<213> ORGANISM: Artificial Sequence
<220> FEATURE:
<223> OTHER INFORMATION: Description of Artificial Sequence:Tx-108C-2

<400> SEQUENCE: 46
gcgccacaaa attaggcgaa tgcactagtg atggatccgt atatgatatc taccgtaccc   60
aacgcgtt                                                            68

<210> SEQ ID NO 47
<211> LENGTH: 52
<212> TYPE: DNA
<213> ORGANISM: Artificial Sequence
<220> FEATURE:
<223> OTHER INFORMATION: Description of Artificial Sequence:Tx-158C-162H
      synthetic sequence

<400> SEQUENCE: 47
ctagggttaa cccgtgtgat gcccagcaat taaagtgatt tgcagtatta ac           52

<210> SEQ ID NO 48
<211> LENGTH: 84
<212> TYPE: DNA
<213> ORGANISM: Artificial Sequence
<220> FEATURE:
<223> OTHER INFORMATION: Description of Artificial Sequence:
      Tx-158C-162H-2

<400> SEQUENCE: 48
tggagtgtta gacgtaatca tcggagctcc ggttcggtta atactgcaaa tcactttaat   60
tgctgggcac agcacgggtt aacc                                          84

<210> SEQ ID NO 49
<211> LENGTH: 40
<212> TYPE: DNA
<213> ORGANISM: Artificial Sequence
<220> FEATURE:
<223> OTHER INFORMATION: Description of Artificial Sequence:Tx-108C-110C
      synthetic seqeuence

<400> SEQUENCE: 49
atatacggat ccatcacaag tgcattcgcc taattttgtg          40

<210> SEQ ID NO 50
<211> LENGTH: 68
<212> TYPE: DNA
<213> ORGANISM: Artificial Sequence
<220> FEATURE:
<223> OTHER INFORMATION: Description of Artificial Sequence:
      Tx-108C-110C-2 synthetic sequence

<400> SEQUENCE: 50
gcgccacaaa attaggcgaa tgcacttgtg atggatccgt atatgatatc taccgtaccc   60
aacgcgtt                                                            68

<210> SEQ ID NO 51
<211> LENGTH: 52
<212> TYPE: DNA
<213> ORGANISM: Artificial Sequence
<220> FEATURE:
```

<223> OTHER INFORMATION: Description of Artificial
      Sequence:Tx-154C-158C-152H synthetic seqeunce

<400> SEQUENCE: 51
ctagggttaa cccgtgtgat gcccagcaat taaagtggca tgcagtatta ac    52

<210> SEQ ID NO 52
<211> LENGTH: 84
<212> TYPE: DNA
<213> ORGANISM: Artificial Sequence
<220> FEATURE:
<223> OTHER INFORMATION: Description of Artificial
      Sequence:Tx-154C-158C-162H-2

<400> SEQUENCE: 52
tggagtgtta gacgtaatca tcggagctcc ggttcggtta atactgcatg ccactttaat    60
tgctgggcac agcacgggtt aacc    84

<210> SEQ ID NO 53
<211> LENGTH: 190
<212> TYPE: PRT
<213> ORGANISM: Artificial Sequence
<220> FEATURE:
<223> OTHER INFORMATION: Description of Artificial Sequence:TrX amino
      acid sequence

<400> SEQUENCE: 53

Gln Thr Ile Gln Pro Gly Thr Gly Tyr Asn Asn Gly Tyr Phe Tyr Ser
 1               5                  10                  15

Tyr Trp Asn Asp Gly His Gly Gly Val Thr Tyr Thr Asn Gly Pro Gly
                20                  25                  30

Gly Gln Phe Ser Val Asn Trp Ser Asn Ser Gly Asn Phe Val Gly Gly
            35                  40                  45

Lys Gly Trp Gln Pro Gly Thr Lys Asn Lys Val Ile Asn Phe Ser Gly
        50                  55                  60

Ser Tyr Asn Pro Asn Gly Asn Ser Tyr Leu Ser Val Tyr Gly Trp Ser
 65                  70                  75                  80

Arg Asn Pro Leu Ile Glu Tyr Tyr Ile Val Glu Asn Phe Gly Thr Tyr
                85                  90                  95

Asn Pro Ser Thr Gly Ala Thr Lys Leu Gly Glu Val Thr Ser Asp Gly
           100                 105                 110

Ser Val Tyr Asp Ile Tyr Arg Thr Gln Arg Val Asn Gln Pro Ser Ile
       115                 120                 125

Ile Gly Thr Ala Thr Phe Tyr Gln Tyr Trp Ser Val Arg Arg Asn His
   130                 135                 140

Arg Ser Ser Gly Ser Val Asn Thr Ala Asn His Phe Asn Ala Trp Ala
145                 150                 155                 160

Gln Gln Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
            180                 185                 190

<210> SEQ ID NO 54
<211> LENGTH: 198
<212> TYPE: DNA
<213> ORGANISM: Artificial Sequence
<220> FEATURE:
<223> OTHER INFORMATION: Description of Artificial Sequence:TrX-DS1
      cassette

<400> SEQUENCE: 54

```
gcgccacaaa attaggcgaa gtcacttgtg atggatccgt atatgatatc taccgtaccc      60
aacgcgttaa tcagccatcg atcattggaa ccgccacctt ttatcagtac tggagtgtta     120
gacgtaatca tcggagctcc ggttcggtta atactgcatg ccactttaat gcctgggcac     180
agcaagggtt aaccctag                                                   198

<210> SEQ ID NO 55
<211> LENGTH: 67
<212> TYPE: PRT
<213> ORGANISM: Artificial Sequence
<220> FEATURE:
<223> OTHER INFORMATION: Description of Artificial Sequence:TrX-DS1
      cassette  aa

<400> SEQUENCE: 55

Gly Ala Thr Lys Leu Gly Glu Val Thr Cys Asp Gly Ser Val Tyr Asp
 1               5                  10                  15

Ile Tyr Arg Thr Gln Arg Val Asn Gln Pro Ser Ile Ile Gly Thr Ala
                20                  25                  30

Thr Phe Tyr Gln Tyr Trp Ser Val Arg Arg Asn His Arg Ser Ser Gly
            35                  40                  45

Ser Val Asn Thr Ala Cys His Phe Asn Ala Trp Ala Gln Gln Gly Leu
        50                  55                  60

Thr Leu Gly
 65

<210> SEQ ID NO 56
<211> LENGTH: 15
<212> TYPE: PRT
<213> ORGANISM: Artificial Sequence
<220> FEATURE:
<223> OTHER INFORMATION: Description of Artificial Sequence:TrX-162H-DS1
      cassette  aa

<400> SEQUENCE: 56

Ala Cys His Phe Asn Ala Trp Ala Gln His Gly Leu Thr Leu Gly
 1               5                  10                  15

<210> SEQ ID NO 57
<211> LENGTH: 198
<212> TYPE: DNA
<213> ORGANISM: Artificial Sequence
<220> FEATURE:
<223> OTHER INFORMATION: Description of Artificial Sequence:TrX-162H-DS2
      cassette

<400> SEQUENCE: 57
gcgccacaaa attaggcgaa tgcactagtg atggatccgt atatgatatc taccgtaccc      60
aacgcgttaa tcagccatcg atcattggaa ccgccacctt ttatcagtac tggagtgtta     120
gacgtaatca tcggagctcc ggttcggtta atactgcaaa tcactttaat tgctgggcac     180
agcacgggtt aaccctag                                                   198

<210> SEQ ID NO 58
<211> LENGTH: 67
<212> TYPE: PRT
<213> ORGANISM: Artificial Sequence
<220> FEATURE:
<223> OTHER INFORMATION: Description of Artificial Sequence:TrX-162H-DS2
      cassette  aa

<400> SEQUENCE: 58
```

```
Gly Ala Thr Lys Leu Gly Glu Cys Thr Ser Asp Ser Val Tyr Asp
 1               5                  10                  15

Ile Tyr Arg Thr Gln Arg Val Asn Gln Pro Ser Ile Ile Gly Thr Ala
                 20                  25                  30

Thr Phe Tyr Gln Tyr Trp Ser Val Arg Arg Asn His Arg Ser Ser Gly
             35                  40                  45

Ser Val Asn Thr Ala Asn His Phe Asn Cys Trp Ala Gln His Gly Leu
         50                  55                  60

Thr Leu Gly
 65
```

<210> SEQ ID NO 59
<211> LENGTH: 198
<212> TYPE: DNA
<213> ORGANISM: Artificial Sequence
<220> FEATURE:
<223> OTHER INFORMATION: Description of Artificial Sequence:TrX-162H-DS4
      cassette

<400> SEQUENCE: 59

```
gcgccacaaa attaggcgaa tgcacttgtg atggatccgt atatgatatc taccgtaccc      60
aacgcgttaa tcagccatcg atcattggaa ccgccacctt ttatcagtac tggagtgtta     120
gacgtaatca tcggagctcc ggttcggtta atactgcatg ccactttaat tgctgggcac     180
agcacgggtt aaccctag                                                   198
```

<210> SEQ ID NO 60
<211> LENGTH: 67
<212> TYPE: PRT
<213> ORGANISM: Artificial Sequence
<220> FEATURE:
<223> OTHER INFORMATION: Description of Artificial Sequence:TrX-162H-DS4
      cassete aa

<400> SEQUENCE: 60

```
Gly Ala Thr Lys Leu Gly Glu Cys Thr Cys Asp Gly Ser Val Tyr Asp
 1               5                  10                  15

Ile Tyr Arg Thr Gln Arg Val Asn Gln Pro Ser Ile Ile Gly Thr Ala
                 20                  25                  30

Thr Phe Tyr Gln Tyr Trp Ser Val Arg Arg Asn His Arg Ser Ser Gly
             35                  40                  45

Ser Val Asn Thr Ala Cys His Phe Asn Cys Trp Ala Gln His Gly Leu
         50                  55                  60

Thr Leu Gly
 65
```

<210> SEQ ID NO 61
<211> LENGTH: 42
<212> TYPE: DNA
<213> ORGANISM: Artificial Sequence
<220> FEATURE:
<223> OTHER INFORMATION: Description of Artificial Sequence:TrX-162H-DS1
      cassette

<400> SEQUENCE: 61

```
catgccactt caatgcatgg gcacagcacg ggttaaccct ag                         42
```

<210> SEQ ID NO 62
<211> LENGTH: 190
<212> TYPE: PRT
<213> ORGANISM: Artificial Sequence
<220> FEATURE:

<223> OTHER INFORMATION: TrX-162H-DS1

<400> SEQUENCE: 62

Gln Thr Ile Gln Pro Gly Thr Gly Tyr Asn Asn Gly Tyr Phe Tyr Ser
1               5                   10                  15

Tyr Trp Asn Asp Gly His Gly Gly Val Thr Tyr Thr Asn Gly Pro Gly
            20                  25                  30

Gly Gln Phe Ser Val Asn Trp Ser Asn Ser Gly Asn Phe Val Gly Gly
        35                  40                  45

Lys Gly Trp Gln Pro Gly Thr Lys Asn Lys Val Ile Asn Phe Ser Gly
    50                  55                  60

Ser Tyr Asn Pro Asn Gly Asn Ser Tyr Leu Ser Val Tyr Gly Trp Ser
65              70                  75                  80

Arg Asn Pro Leu Ile Glu Tyr Tyr Ile Val Glu Asn Phe Gly Thr Tyr
                85                  90                  95

Asn Pro Ser Thr Gly Ala Thr Lys Leu Gly Glu Val Thr Cys Asp Gly
            100                 105                 110

Ser Val Tyr Asp Ile Tyr Arg Thr Gln Arg Val Asn Gln Pro Ser Ile
        115                 120                 125

Ile Gly Thr Ala Thr Phe Tyr Gln Tyr Trp Ser Val Arg Arg Asn His
    130                 135                 140

Arg Ser Ser Gly Ser Val Asn Thr Ala Cys His Phe Asn Ala Trp Ala
145                 150                 155                 160

Gln His Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
            180                 185                 190

<210> SEQ ID NO 63
<211> LENGTH: 190
<212> TYPE: PRT
<213> ORGANISM: Artificial Sequence
<220> FEATURE:
<223> OTHER INFORMATION: TrX-162H-DS2

<400> SEQUENCE: 63

Gln Thr Ile Gln Pro Gly Thr Gly Tyr Asn Asn Gly Tyr Phe Tyr Ser
1               5                   10                  15

Tyr Trp Asn Asp Gly His Gly Gly Val Thr Tyr Thr Asn Gly Pro Gly
            20                  25                  30

Gly Gln Phe Ser Val Asn Trp Ser Asn Ser Gly Asn Phe Val Gly Gly
        35                  40                  45

Lys Gly Trp Gln Pro Gly Thr Lys Asn Lys Val Ile Asn Phe Ser Gly
    50                  55                  60

Ser Tyr Asn Pro Asn Gly Asn Ser Tyr Leu Ser Val Tyr Gly Trp Ser
65              70                  75                  80

Arg Asn Pro Leu Ile Glu Tyr Tyr Ile Val Glu Asn Phe Gly Thr Tyr
                85                  90                  95

Asn Pro Ser Thr Gly Ala Thr Lys Leu Gly Glu Cys Thr Ser Asp Gly
            100                 105                 110

Ser Val Tyr Asp Ile Tyr Arg Thr Gln Arg Val Asn Gln Pro Ser Ile
        115                 120                 125

Ile Gly Thr Ala Thr Phe Tyr Gln Tyr Trp Ser Val Arg Arg Asn His
    130                 135                 140

Arg Ser Ser Gly Ser Val Asn Thr Ala Asn His Phe Asn Cys Trp Ala
145                 150                 155                 160

```
Gln His Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
            180                 185                 190

<210> SEQ ID NO 64
<211> LENGTH: 190
<212> TYPE: PRT
<213> ORGANISM: Artificial Sequence
<220> FEATURE:
<223> OTHER INFORMATION: TrX-162H-DS4

<400> SEQUENCE: 64

Gln Thr Ile Gln Pro Gly Thr Gly Tyr Asn Asn Gly Tyr Phe Tyr Ser
  1               5                  10                  15

Tyr Trp Asn Asp Gly His Gly Gly Val Thr Tyr Thr Asn Gly Pro Gly
                 20                  25                  30

Gly Gln Phe Ser Val Asn Trp Ser Asn Ser Gly Asn Phe Val Gly Gly
             35                  40                  45

Lys Gly Trp Gln Pro Gly Thr Lys Asn Lys Val Ile Asn Phe Ser Gly
 50                  55                  60

Ser Tyr Asn Pro Asn Gly Asn Ser Tyr Leu Ser Val Tyr Gly Trp Ser
 65                  70                  75                  80

Arg Asn Pro Leu Ile Glu Tyr Tyr Ile Val Glu Asn Phe Gly Thr Tyr
                 85                  90                  95

Asn Pro Ser Thr Gly Ala Thr Lys Leu Gly Glu Cys Thr Cys Asp Gly
            100                 105                 110

Ser Val Tyr Asp Ile Tyr Arg Thr Gln Arg Val Asn Gln Pro Ser Ile
            115                 120                 125

Ile Gly Thr Ala Thr Phe Tyr Gln Tyr Trp Ser Val Arg Arg Asn His
130                 135                 140

Arg Ser Ser Gly Ser Val Asn Thr Ala Cys His Phe Asn Cys Trp Ala
145                 150                 155                 160

Gln His Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
            180                 185                 190

<210> SEQ ID NO 65
<211> LENGTH: 190
<212> TYPE: PRT
<213> ORGANISM: Artificial Sequence
<220> FEATURE:
<223> OTHER INFORMATION: TrX-DS8

<400> SEQUENCE: 65

Gln Thr Ile Gln Pro Gly Thr Gly Tyr His Asn Gly Tyr Phe Tyr Ser
  1               5                  10                  15

Tyr Trp Asn Asp Gly His Gly Gly Val Thr Met Thr Leu Gly Pro Gly
                 20                  25                  30

Gly Gln Phe Ser Val Asn Trp Ser Asn Ser Gly Asp Phe Val Gly Gly
             35                  40                  45

Lys Gly Trp Gln Pro Gly Thr Lys Asn Lys Val Ile Asn Phe Ser Gly
 50                  55                  60

Ser Tyr Asn Pro Asn Gly Asn Ser Tyr Leu Ser Val Tyr Gly Trp Ser
 65                  70                  75                  80

Arg Asn Pro Leu Ile Glu Tyr Tyr Ile Val Glu Asn Phe Gly Thr Tyr
```

-continued

```
                  85                  90                  95
Asn Pro Ser Thr Gly Ala Thr Lys Leu Gly Glu Val Thr Cys Asp Gly
                100                 105                 110

Ser Val Tyr Asp Ile Tyr Arg Thr Gln Arg Val Asn Ala Pro Ser Ile
            115                 120                 125

Glu Gly Thr Ala Thr Phe Tyr Gln Tyr Trp Ser Val Arg Arg Asn His
        130                 135                 140

Arg Ser Ser Gly Ser Val Asn Thr Ala Cys His Phe Asn Ala Trp Ala
145                 150                 155                 160

Gln His Gly Leu Thr Leu Gly Thr Met Asp Tyr Gln Ile Val Ala Val
                165                 170                 175

Glu Gly Tyr Phe Ser Ser Gly Ser Ala Ser Ile Thr Val Ser
                180                 185                 190
```

THERMOSTABLE XYLANASES

This application is a claims priority to U.S. Provisional Application No. 60/108,504, filed Nov. 16, 1998.

The present invention relates to thermostable xylanase enzymes. More specifically, the present invention is directed to thermostable xylanase enzymes that exhibit high activity at or near physiological pH and temperature, and their use in feed pelleting applications.

BACKGROUND OF THE INVENTION

Natural xylanase enzymes, such as that of the fungus *Trichoderma reesei*, have been added to animal feed to increase the efficiency of digestion and assimilation of nutrients. During digestion of feed grains such as wheat and barley, non-starch polysaccharides, including xylan, increases the viscosity of the digesta in the absence of added exogenous enzyme. This interferes with the diffusion of the digestive enzymes to the feed and the subsequent assimilation of the nutrients. The highly viscous digesta increases the occurrence of sticky stool, which increases the likelihood of disease and causes effluent run-off problems. The addition of xylanase in feed breaks down the xylan and decreases the viscosity of the digesta, thereby helping to alleviate these problems. Xylanase produces a cost saving by increasing the efficiency of feed conversion. Xylanase can decrease the feed consumed/weight gain ratio by 5–15% (Viveros, A., Brenes, A., Pizarro, M. and Castano, M., 1994, Animal Feed Sci. Technol. 48:237–251).

Xylanase enzymes used for feed are typically aqueous solutions of active protein, stabilizers, preservatives and other additives. The enzymes are typically sprayed onto the feed at concentration of 100–2000 ml per tonne feed. Alternatively, granular or powdered xylanase can be used. Once the feed is consumed by the animal, the enzyme acts on xylan as the feed is ingested and digested in the gut. Eventually the xylanase, a protein molecule, is hydrolysed by the digestive enzymes (proteases) into amino acids like any protein in the feed.

Increasingly, animal feeds are pelleted at high temperatures for sterilization against harmful bacteria, for example *Salmonella*. Feed pelleting is carried out by heating the feed solids with 100 to 140° C. steam and passing them through an extruder/pelleting auger to form feed pellets, which then cool in a storage bin. The typical time required for the material to pass through the system is 30 minutes. As is known in the art, higher temperatures can be used with shorter pelleting times, and lower temperatures with longer pelleting times, provided that the necessary moisture levels are obtained. The overall resulting temperature within the solids, prior to, during, and after pellet formation reaches about 70–95° C., for up to 30 min. It is desirable to add the xylanase during the feed pelleting process. This would save the feed formulators the additional step of adding liquid xylanase, which is inconvenient and can introduce microbial contamination into the feed. The option of adding solid xylanase as a separate step is also undesirable, as the solids would not be evenly mixed. Marquardt and Bedford (1997, Enzymes in Poultry and Swine Nutrition, Marquardt R. R. and Han Z. eds., pp. 129–138) indicate that even though currently available enzymes are beneficial for use as feed additives, new enzymes exhibiting high activity and resistance to heat treatment are also desired, however, they note that enzymes exhibiting these properties are not available.

Xylanases of Family 11 (also termed Family G xylanases) have several properties suitable for feed applications due to their small size and high activity. An example of a moderate temperature Family 11 xylanases is TrX, which is obtained from *Trichoderma reesei*. Moderate temperature xylanases are proven feed additive enzymes with temperature and pH optima compatible with the physiological conditions in the digestive system of animals. However, these enzymes can not tolerate the high temperature of the pelleting process and become inactive during this step.

Xylanases from high temperature microorganisms (eg. a thermophile), for example *Thermomonospora fusca* xylanase (termed TfX, also a Family 11 xylanase), have also been considered for feed pelleting. The thermostability of such enzymes is sufficient to tolerate the pelleting temperatures. However, thermophilic xylanases have optimum activity at high temperatures (70–80° C.), and several of these enzymes have a high pH optimum of 7–9. When introduced into the digesting system of an animal, with a physiological temperature of around 40° C. (e.g. poultry 43° C., a similar temperature is noted within swine) and pH of 3–5 in the digesta, these enzymes function poorly.

Family 11 xylanases have been modified by protein engineering to improve the properties of these enzymes for industrial applications. These modifications have been directed at increasing the temperature and pH optima, along with the thermostability, of these enzymes for specific applications. For example, U.S. Pat. No. 5,405,769 (WO 94/24270) is directed to site-specific mutagenesis of *Bacillus circulans* xylanase (BcX) for the improvement of the thermostability of this enzyme. The disclosed modifications relate to the formation of intermolecular and intramolecular disulfide bonds within BcX, and these modifications resulted in increased thermostability. For example, an improvement in thermostability of up to 6° C. with the addition of a single disulfide bond, and up to 10° C. with two disulphide bonds was observed. Other modifications included linking the N- and C-termini which increased thermostability by 6° C., or N-terminal mutations, which increased thermostability by 2° C. However, with all of the above modifications the resultant enzymes were either less active (up to 45% less active), or exhibited an increase in the temperature and pH optima. As such these enzymes are not suitable for feed pelleting applications.

U.S. Pat. No. 5,759,840 also discloses modifications to BcX and *Trichoderma reesei* xylanase (TrX) to increase the thermostability, while at the same time increase the temperature and pH optima of these enzymes. Again, these xylanases would not be suitable for feed pelleting applications.

The above results are in agreement with other reports that note that disulfide bonds are not among the thermostabilization mechanisms employed by thermophilic enzymes (Cowan, D. A., 1995, Essays Biochem. 29:193–207), as the disulfide can be broken into dehydroalanine and thiocysteine at temperatures over 80° C. Therefore, the enhancement of stability of an enzyme using disulfide bonds is limited to lower temperature ranges. The disulfide bond is thus not recommended to improve the stability of the enzyme at high temperatures (Gupta, M. N., 1991, Biotech. Applied Biochem. 14:1–11; Cowan, D. A., 1995, Essays Biochem. 29:193–207).

None of the above documents address methods for obtaining xylanase enzymes using conventional screening techniques, or by modifying xylanase enzymes, that exhibit the properties of higher temperature tolerance while maintaining optimal performance under conditions of physiological pH and temperature.

An improvement in the thermostability of *Trichoderma reesei* xylanase II was reported by Paloheimo et al (Paloheimo, M., Mantyla, A., Vehmaanpera, J., Hakola, S., Lantto, R., Lahtinen, T., Parkkinen, E., Fagerstrom, R. and Suominen, P. 1997, in Carbohydrases from *Trichoderma reesei* and Other Microorganisms p255–264). Of the five mutants characterized, the most improved mutant (glutamic acid-38 TrX) retained 50% of activity at 57° C. after 9 min, as compared to 7 min by wide type TrX. Arase et al (Arase, A., Yomo, T., Urabe, I., Hata, Y., Katsube, Y. and Okada, H., 1993, FEBS Lett. 316:123–127) describes several modifications to improve the thermostability of a *Bacillus pumilis* xylanase (BpX), however only up to 40% of the residual enzymatic activity was maintained following incubation of these enzymes at a temperature of 57° C. for 20 min. Even though, in both of these studies the effects of increased thermostability on pH and temperature optima of the enzymes were not determined, these enzymes exhibit inadequate thermostability for feed pelleting applications.

In spite of a wide range of experience in screening, testing and modifying xylanase enzymes, there are no reports of xylanases that exhibit the combination of properties required for feed pelleting applications: high thermostability, with optimum activity at physiological pH and temperature. No natural xylanases have been selected, nor has any mutation methodology for the Family 11 xylanases been developed to increase thermostability of xylanase enzymes to, without any change in the temperature and pH optima, and a concomitant loss of the specific activity of the enzyme. Such selected natural xylanases, or xylanases prepared using mutation methodology would offer the advantages of enhancement of feed digestibility and processing in pelleting.

The present invention is directed to obtaining xylanase enzymes that exhibit the property of increased thermostability, while maintaining pH and temperature optima that are typically found under physiological conditions.

It is an object of the invention to overcome disadvantages of the prior art.

The above object is met by the combinations of features of the main claims, the sub-claims disclose further advantageous embodiments of the invention.

SUMMARY OF THE INVENTION

The present invention relates to thermostable xylanase enzymes. More specifically, the present invention is directed to thermostable xylanase enzymes that exhibit high activity at or near physiological pH and temperature, and the use of these xylanase enzymes in feed pelleting applications.

According to the present invention there is provided an isolated xylanase comprising at least 40% of optimal activity from about pH 3.5 to about pH 6.0, and from about 40 to about 60° C., the isolated xylanase being thermostable. The thermostability is characterized by the isolated xylanase exhibiting at least 30% of optimal activity after a pre-incubation step for 30 minutes at 70° C. in the presence of 40% glycerol. The thermostability may also be characterized by the isolated xylanase exhibiting at least 30% of optimal activity after a pre-incubation step for 30 minutes at 62.5° C.

The present invention is also directed to a modified xylanase, comprising at least 40% of optimal activity from about pH 3.5 to about pH 6.0, and from about 40 to about 60° C., the modified xylanase being thermostable. This invention also embraces a modified xylanase comprising a basic amino acid at position 162 (TrX numbering), or its equivalent position. The basic amino acid is selected from the group consisting of lysine, arginine and histidine. Preferably the basic amino acid is histidine.

This invention also pertains to the modified xylanase as defined above, wherein the modified xylanase comprises at least one disulfide bridge. Preferably, the modified xylanase comprises one or two disulfide bridges.

The present invention is also directed to a modified xylanase as defined above, wherein the xylanase is a Family 11 xylanase. Furthermore, this invention pertains to a modified xylanase, wherein the Family 11 xylanase is from *Trichoderma*.

The present invention is also directed to the modified xylanase as defined above wherein said xylanase is selected from the group consisting of TrX-162H-DS1, TrX-162H-DS2, and TrX-162H-DS4.

This invention also includes a method of obtaining a xylanase comprising:

i) selecting an organism that exhibits xylanase activity, obtaining xylanase from the organism;
ii) determining whether the xylanase exhibits at least 40% of optimal activity from about pH 3.5 to about pH 6.0, and from about 40 to about 60° C.;
iii) determining whether the xylanase is thermostable; and
iv) retaining the xylanase that express these properties Step i) of the above method may also include partially purifying the xylanase.

The present invention also pertains to a method of preparing animal feed, wherein the method comprises applying the isolated xylanase as defined above onto the animal feed to produce a xylanase-animal feed combination, and heat sterilizing the xylanase-animal feed combination. Preferably, the animal feed is a poultry or swine feed.

The present invention is directed to obtaining xylanase enzymes that exhibit pH and temperature optima that are found within the digesta of an animal, while at the same time the xylanase molecule exhibits thermostability and can therefore withstand processes associated with sterilizing and producing pelleted feed. The prior art discloses obtaining thermostable enzymes, either through selection of native enzymes, or through genetic engineering, however, these enzymes do not exhibit physiological pH and temperature optima. The prior art also discloses xylanase enzymes that exhibit optimal enzyme activity at physiological pH and temperature, however, these enzymes are not thermally stable. Furthermore, there is nothing in the prior art to suggest that native xylanase enzymes exist, or that xylanase enzymes may be modified as disclosed herein win order to obtain xylanase enzymes that exhibit high temperature tolerance suitable for feed pelleting, and retain optimum enzymatic activity at or near physiological conditions.

This summary of the invention does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein:

FIG. 1 shows the multiple amino acid sequence alignment among family 11 xylanases. The amino acids common to at least 80% of the Family 11 xylanases listed are indicated in bold. The residues common to all Family 11 xylanases are underlined. *Bacillus pumilus* (Bp); *Clostridium acetobutylicum* P262 XynB (Ca); *Clostridium stercorarium* (Cs); *Ruminococcus flavefaciens* (Rf); *Trichoderma reesei* XynII (Tr2); *Trichoderma viride* (Tv); *Trichoderma harzianum* (Th); *Schizophyllum commune* Xylanase A (Sc); *Aspergillus niger* var. *awamori* (An); *Aspergillus tubigensis* (At); *Trichoderma reesei* XynI (Tr1); *Streptomyces* sp. No. 36a (Ss); *Streptomyces lividans* Xylanase B (S1B); *Streptomyces lividans* Xln C(S1C); *Thermomonospora fusca* TfxA (Tf); *Bacillus circulans* (Bc); *Bacillus subtilis* (Bs)

FIG. 2 shows the synthetic oligonucleotides for the construction of gene sequence encoding the *Trichoderma* xylanase in the plasmid pTrX (SEQ ID NO: 18).

FIG. 4 shows the effect of temperatures on the residual enzymatic activity of several of the modified xylanases of the present invention.

DESCRIPTION OF PREFERRED EMBODIMENT

The present invention relates to thermostable xylanase enzymes and their use as feed additives. More specifically, the present invention is directed to thermostable xylanase enzymes that show good thermostability and exhibit high activity at or near physiological pH and temperature.

The following description is of a preferred embodiment by way of example only and without limitation to the combination of features necessary for carrying the invention into effect.

By physiological pH and temperature, it is meant the range in temperature and pH compatible with the digestive system within an animal, for example but not limited to, poultry and swine. For example, a suitable physiological temperature range is from about 35 to about 60° C., more preferably, this range is from about 40 to about 50° C. Similarly, a suitable physiological pH range is from about pH 3.0 to about 7.0, preferably, this range is from about pH 3.5 to about 6.0. The time required for the digestion of feed within the gut of an animal varies from animal to animal. For example, in swine digestion of feed is from about 2 to about 4 hours, while in poultry it is up to about 12 hours.

By high activity at physiological pH and temperature, it is meant that the enzyme exhibits at least 40% of its optimum activity at physiological pH and temperature. The optimum pH and temperature-range can be outside the physiological range, provided that the enzyme exhibits at least 40% of its optimum activity within the physiological range, for example from about 40 to about 50° C. and pH from about 3.5 to about 6. Examples 4 and 5 describe the determination of a suitable xylanase enzyme that exhibits these properties.

Figure 3:
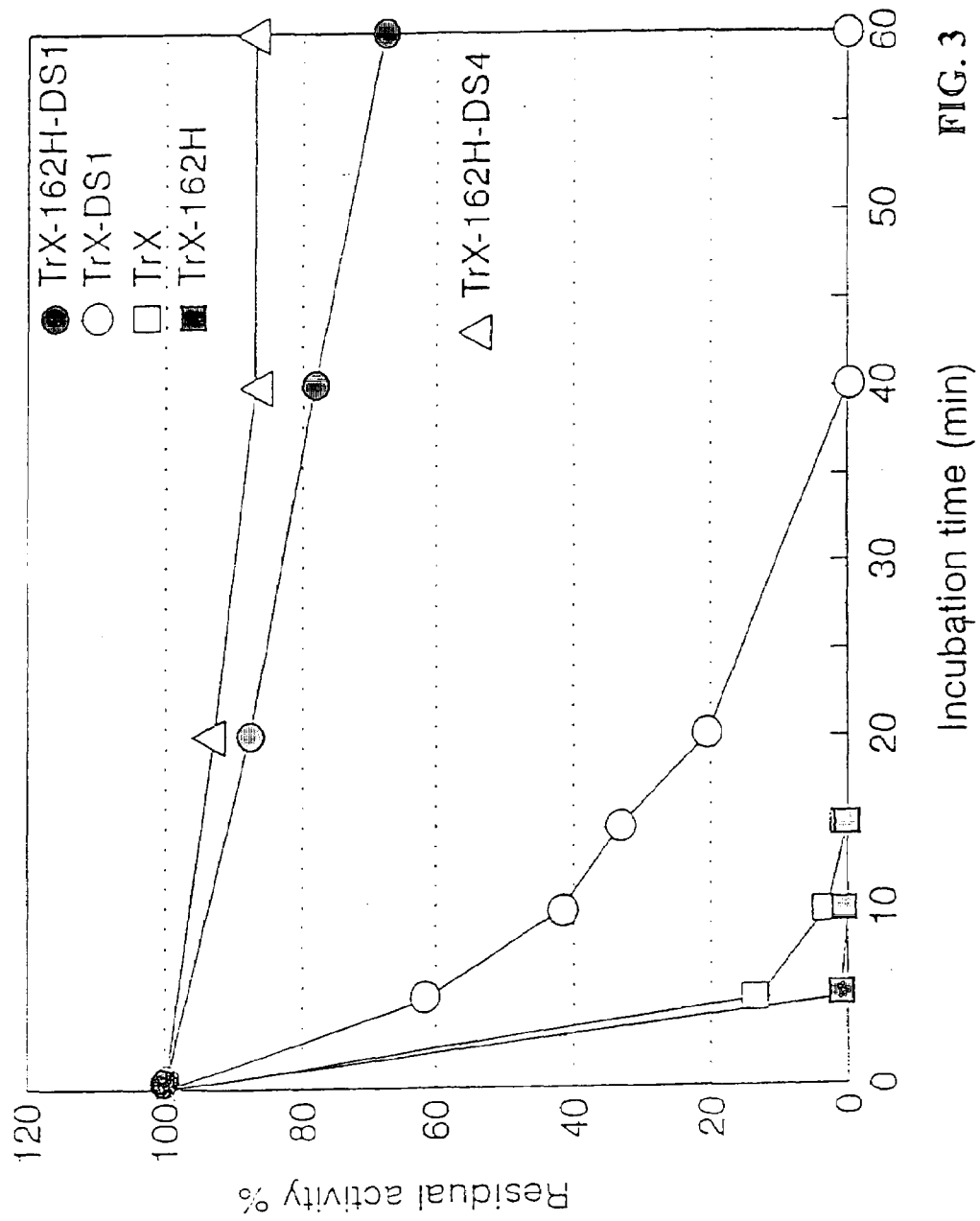
FIG. 3 shows the effect of incubation time on the residual enzymatic activity of mutant TrX, TrX-DS1, TrX-162H, TrX-162H-DS1, and TrX-162H-DS4 at 62.5° C. The data are normalized to that observed at 0 min.
Figure 4A:
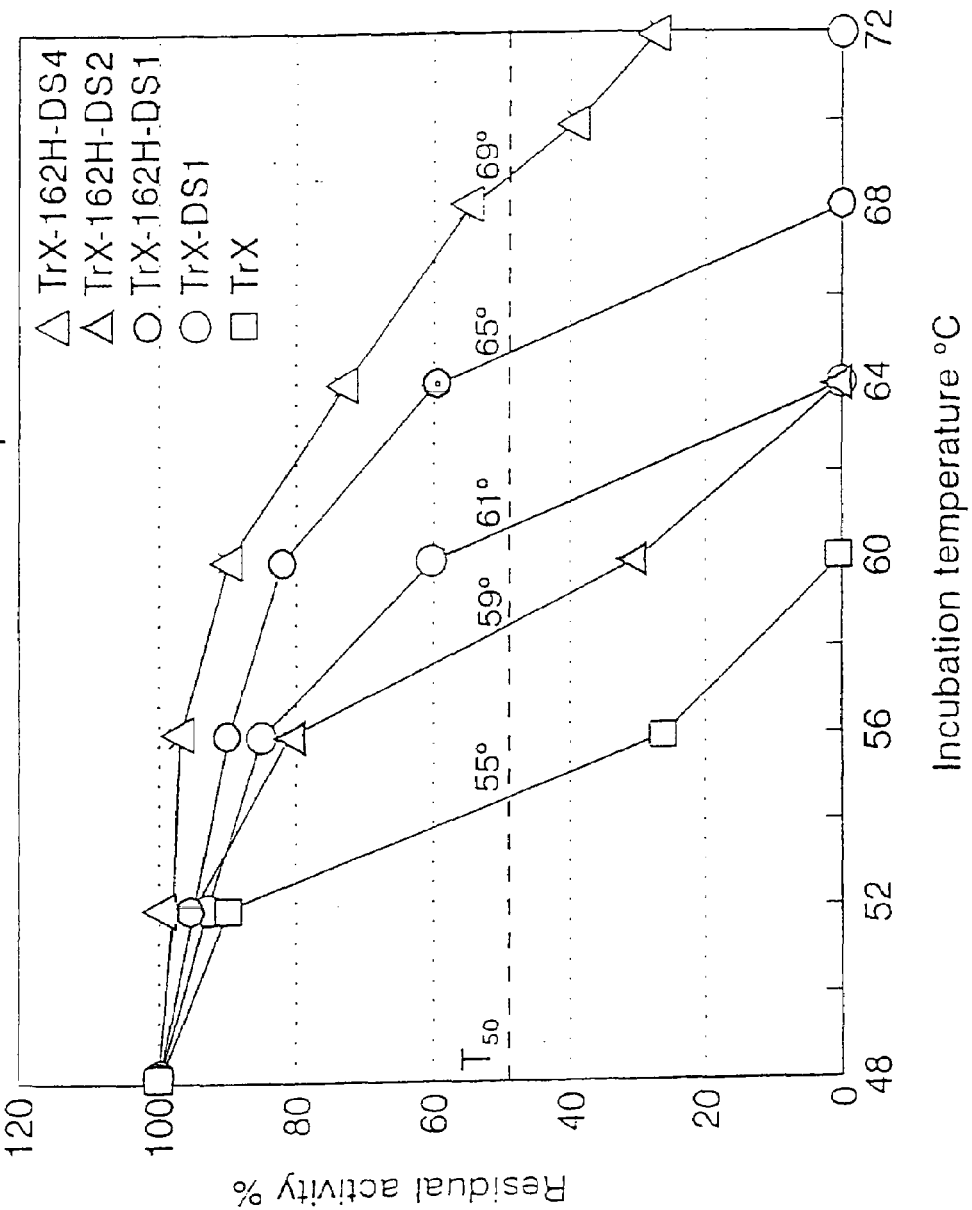
FIG. 4(a) shows the residual enzymatic activity of TrX, TrX-DS1, TrX-162H-DS1, TrX-162H-DS2, and TrX-162H-DS4 in sodium citrate buffer in a 30 min incubation.
Figure 4B:
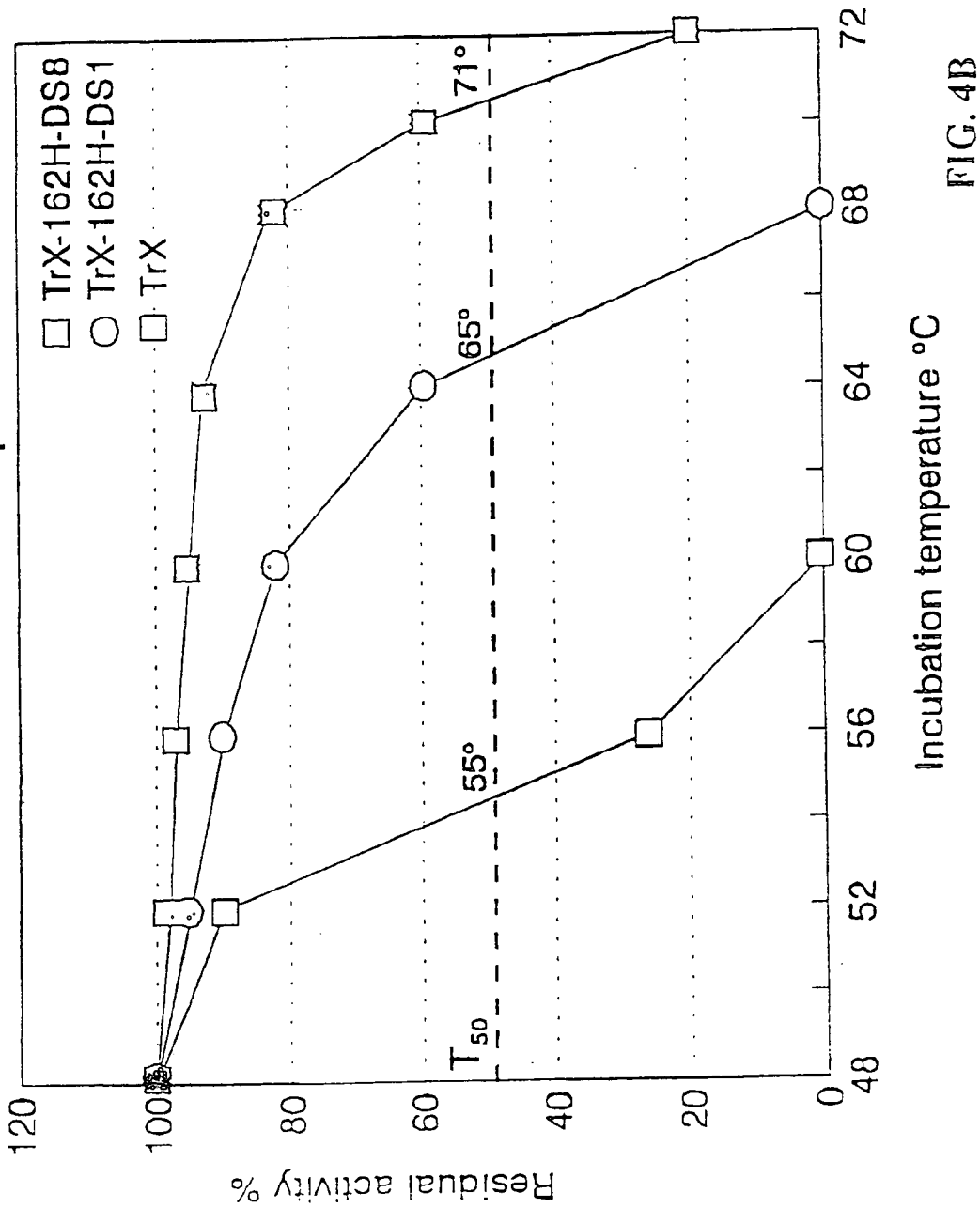
FIG. 4(b) shows the effect of temperatures on the residual enzymatic activity of the mutant TrX-DS8. For FIGS. 4(a) and (b) The data are normalized to that observed at 48° C. The $T_{50}$, which is the incubation temperature allowing the maintenance of 50% residual activity after 30 min, was determined for each mutant TrX.
Figure 5:
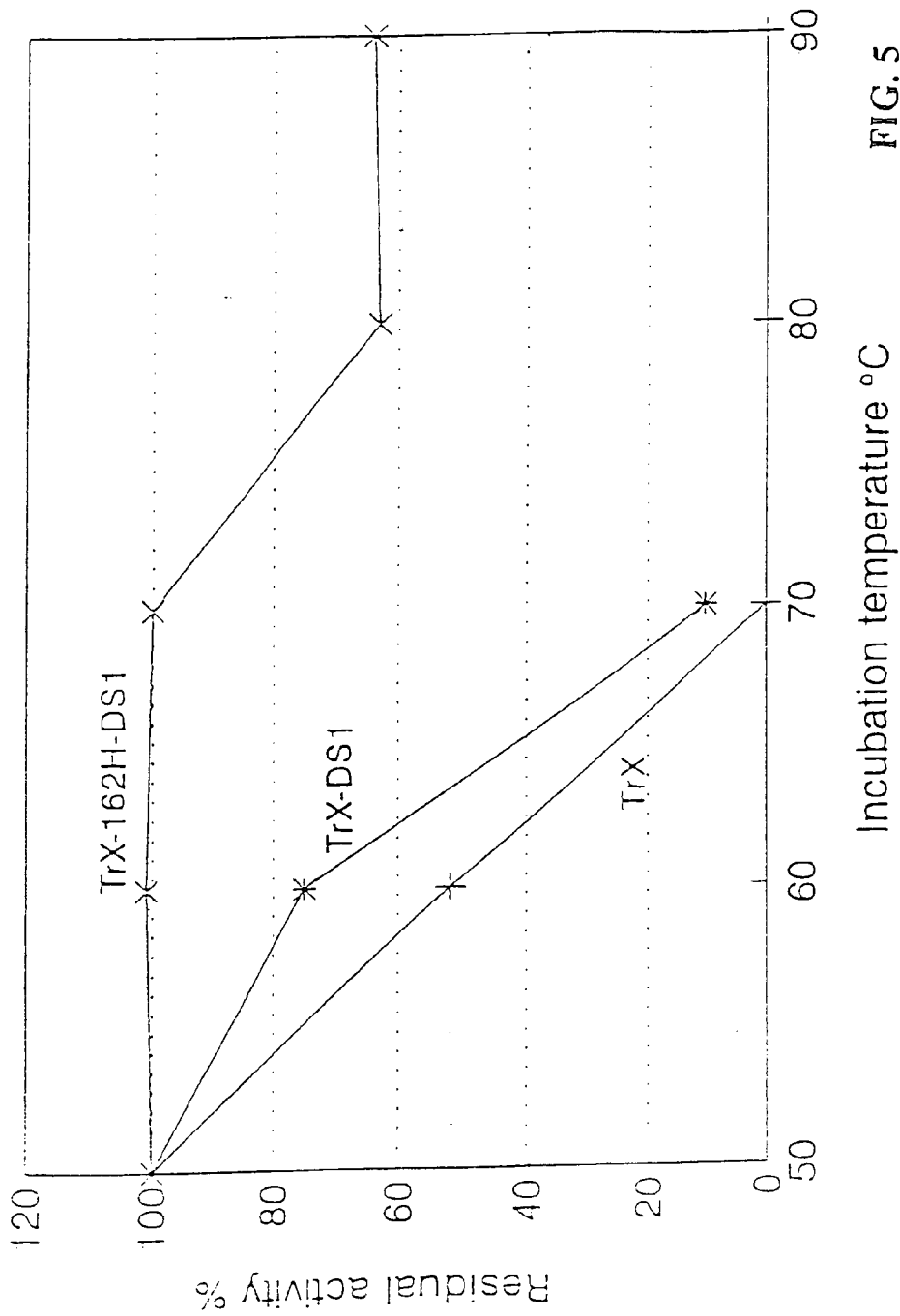
FIG. 5 shows the effect of temperatures on the residual enzymatic activity of mutant TrX, Trx-DS1 and TrX-162H-DS1 in 40% glycerol in a 30 min incubation. The data are normalized to that observed at 50° C.

"Thermostable" or "thermostability" as used herein refer to a property of an enzyme. An enzyme is considered to be thermostable if it exhibits at least one of the following properties:

1) the enzyme exhibits at least 30% of its optimal activity following a pre-incubation step of 30 min at 70° C., 80° C., or 90° C., at pH 5.0, in the presence of a stabilizing agent such as 40% glycerol. Preferably, the enzyme exhibits at least 40% of its optimal activity following a 30 min, 70° C. pre-incubation step in glycerol, for example but not limited to, TrX-162H-DS1 (FIG. 5);

2) the enzyme exhibits 30% of its optimal activity following a pre-incubation step of 30 or 60 min at 62.5° C. in the absence of a stabilizer. Preferably, the enzyme exhibits at least 40% of its optimal activity following a 30 min pre-incubation, for example but not limited to, TrX-162H-DS1 and TrX-162H-DS4 (FIG. 3);

3) the enzyme exhibits at least 30% of its optimal activity following a preincubation step of 30 min at 64° C. in the absence of a stabilizer. Preferably, the enzyme exhibits at least 40% of its optimal activity following the 30 min, 64° C. pre-incubation step, for example but not limited to, TrX-162H-DS1 and TrX-162H-DS4 (FIG. 4); or 4) the enzyme exhibits at least 30% of its optimal activity following a preincubation step of 30 min at 68° C. in the absence of a stabilizer. Preferably, the enzyme exhibits at least 40% of its optimal activity following the 30 min, 68° C. pre-incubation step, for example but not limited to, TrX-162H-DS1 and TrX-162H-DS4 (FIG. 4).

In each of the above cases, the optimal activity of the enzyme is determined at an optimal pH and temperature for that enzyme in the presence or absence of stabilizer as required.

By "TrX numbering" it is meant the numbering associated with the position of amino acids based on the amino acid sequence of TrX (Xyn II-Table 1; Tr2-FIG. 1). As disclosed below and as is evident upon review of FIG. 1, Family 11 xylanases exhibit a substantial degree of sequence homology. Therefore, by aligning the amino acids to optimize the sequence similarity between xylanase enzymes and by using the amino acid numbering of TrX as the basis for numbering, the positions of amino acids within other xylanase enzymes can be determined relative to TrX.

By modified xylanase, it is meant the alteration of a xylanase molecule using techniques that are known to one of skill in the art. These techniques include, but are not limited to, site directed mutagenesis, cassette mutagenesis, synthetic oligonucleotide construction, cloning and other genetic engineering techniques. Alterations of a xylanase enzyme, in order to produce a modified xylanase may also arise as a result of applying techniques directed at inducing mutations within native or genetically engineered xylanases via the addition of known chemical mutagens, UV exposure, or other treatments known to induce mutagensis within a host organisms that express a xylanase of interest. Such techniques are well known within the art.

Table 1 lists the Family 11 xylanases free of cellulase activity. These enzymes share extensive amino acid sequence similarity- and possess amino acids common to Family 11, for example two glutamic acid (E) residues serving as the essential catalytic residues, amino acids 86 and 177 (using TrX numbering). Structural comparisons of several Family 11 xylanases via X-ray crystallography indicates that these Family 11 xylanases of bacterial and fungal origins share the same general molecular structure (see for example U.S. Pat. No. 5,405,769; Arase, A., Yomo, T., Urabe, I., Hata, Y., Katsube, Y. and Okada, H., 1993, FEBS Lett. 316:123–127). Most of the family 11 xylanases identified so far are mesophilic and have low-molecular mass (20 kDa).

TABLE 1

Family 11 xylanases

| Microbe | Xylanase | Ref. in FIG. 1 | Sequence Listing |
|---|---|---|---|
| Aspergillus niger | Xyn A | An | SEQ ID NO: 1 |
| Aspergillus kawachii | Xyn C | | |
| Aspergillus tubigensis | Xyn A | At | SEQ ID NO: 2 |
| Bacillus circulans | Xyn A | Bc | SEQ ID NO: 3 |
| Bacillus pumilus | Xyn A | Bp | SEQ ID NO: 4 |
| Bacillus subtilis | Xyn A | Bs | SEQ ID NO: 5 |
| Cellulomonas fimi | Xyn D | | |
| Chainia spp. | Xyn | | |
| Clostridium acetobutylicum | Xyn B | Ca | SEQ ID NO: 6 |
| Clostridium stercorarium | Xyn A | Cs | SEQ ID NO: 7 |
| Fibrobacter succinognees | Xyn C | | |
| Neocallimasterix patriciarum | Xyn A | | |
| Nocardiopsis dassonvillei | Xyn II | | |
| Ruminococcus flavefaciens | Xyn A | Rf | SEQ ID NO: 8 |
| Schizophyllum commune | Xyn | Sc | SEQ ID NO: 9 |
| Streptomyces lividans | Xyn B | S1B | SEQ ID NO: 10 |
| Streptomyces lividans | Xyn C | S1C | SEQ ID NO: 11 |
| Streptomyces sp. No. 36a | Xyn | Ss | SEQ ID NO: 12 |
| Streptomyces thermoviolaceus | Xyn II | | |
| Thermomonospora fusca | Xyn A | Tf | SEQ ID NO: 13 |
| Trichoderma harzianum | Xyn | Th | SEQ ID NO: 14 |
| Trichoderma reesei | Xyn I | Tr1 | SEQ ID NO: 15 |
| Trichoderma reesei | Xyn II | Tr2 | SEQ ID NO: 16 |
| Trichoderma viride | Xyn | Tv | SEQ ID NO: 17 |

It is considered within the scope of the present invention that xylanases, including Family 11 xylanases for example but not limited to *Trichoderma reesei* xylanase II, *Trichoderma reesei* xylanase I, *Trichoderma viride* xylanase, *Streptomyces lividans* xylanase B and *Streptomyces lividans* xylanase C, may be modified following the general approach and methodology as outlined herein. It is also considered within the scope of the present invention that non-Family 11 xylanases may also be modified following the general principles as described herein in order to obtain a xylanase enzyme that is thermostable and exhibits high activity at physiological pH and temperature.

Furthermore, native xylanases may also be obtained by using standard screening protocols in order to identify enzymes that exhibit the properties of increased thermostability yet maintaining high activity at physiological temperature and pH. Such protocols involve:

- selecting of a desired organism, for example a thermophile;
- extracting or obtaining the xylanase from the organism and partially purifying the enzyme if desired; and
- characterizing the extracted enzyme to determine whether the enzyme is thermostable, as defined above (in the presence or absence of a stabilizing agent, such as glycerol), determining the enzymes pH and temperature optima, and determining the activity of the enzyme at physiological pH and temperature.

Any enzymes identified using the above protocol that exhibit thermostability and high activity at physiological pH and temperature may be used as animal feeds.

Figure 6:
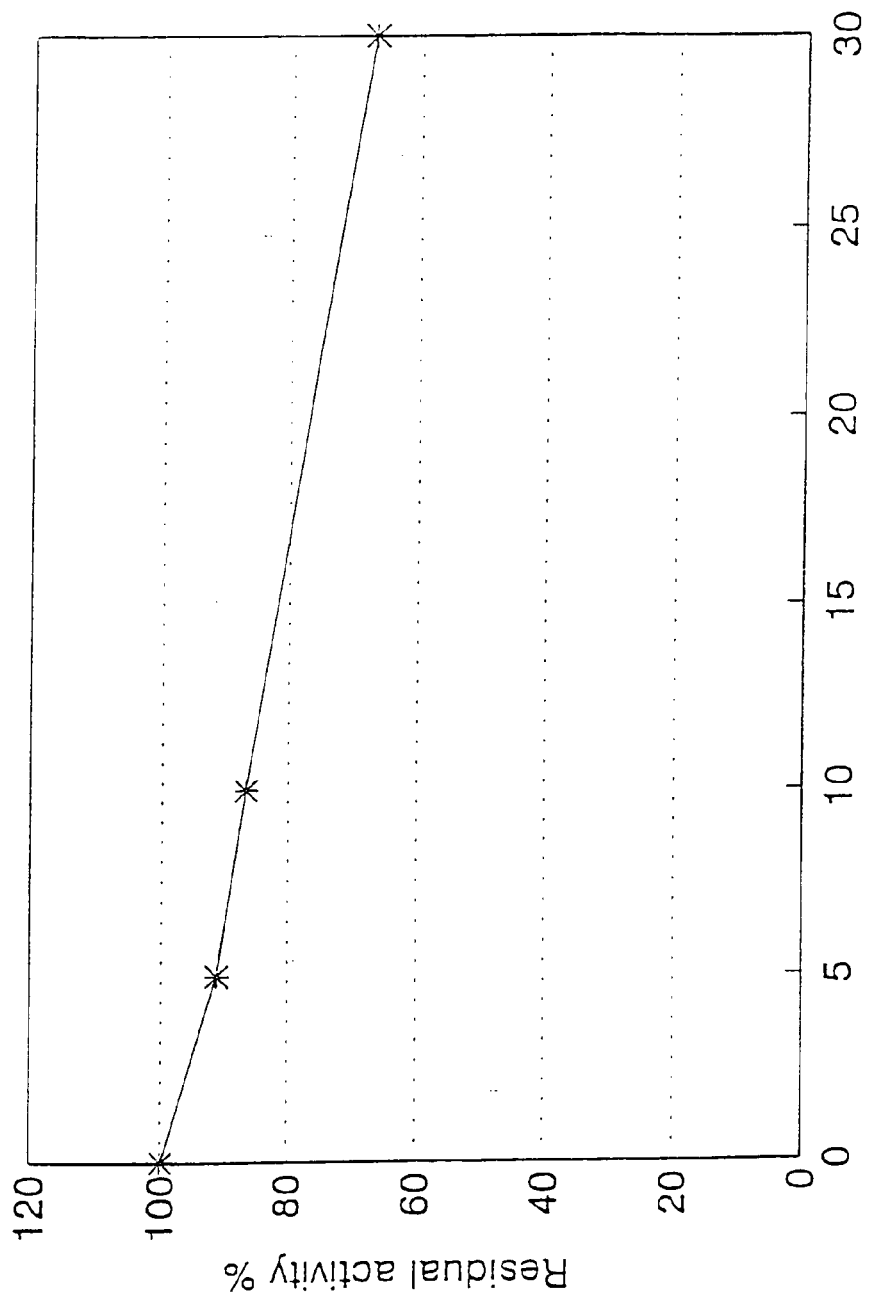
FIG. 6 shows the effect of incubation time on the residual enzymatic activity of TrX-162H-DS1 in 40% glycerol at 90° C. The data are normalized to that observed at 0 min.
Figure 7:
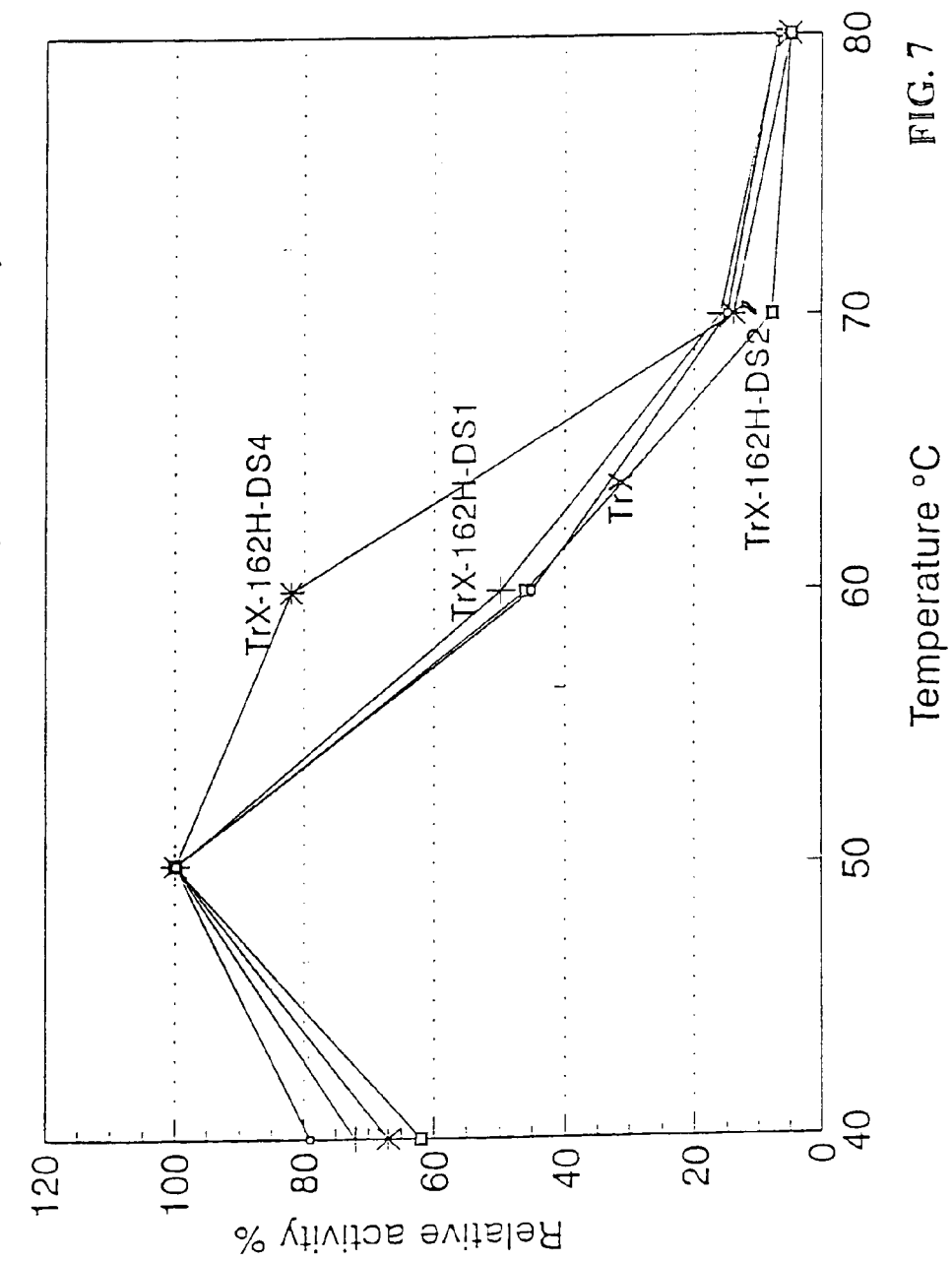
FIG. 7 shows the effect of temperature on release of xylose in a 30 min hydrolysis of soluble xylan by TrX, TrX-162H-DS1. TrX-162H-DS2 and TrX-162H-DS4 at pH 4.5. The data are normalized to that observed at the temperature optimum.
Figure 8:
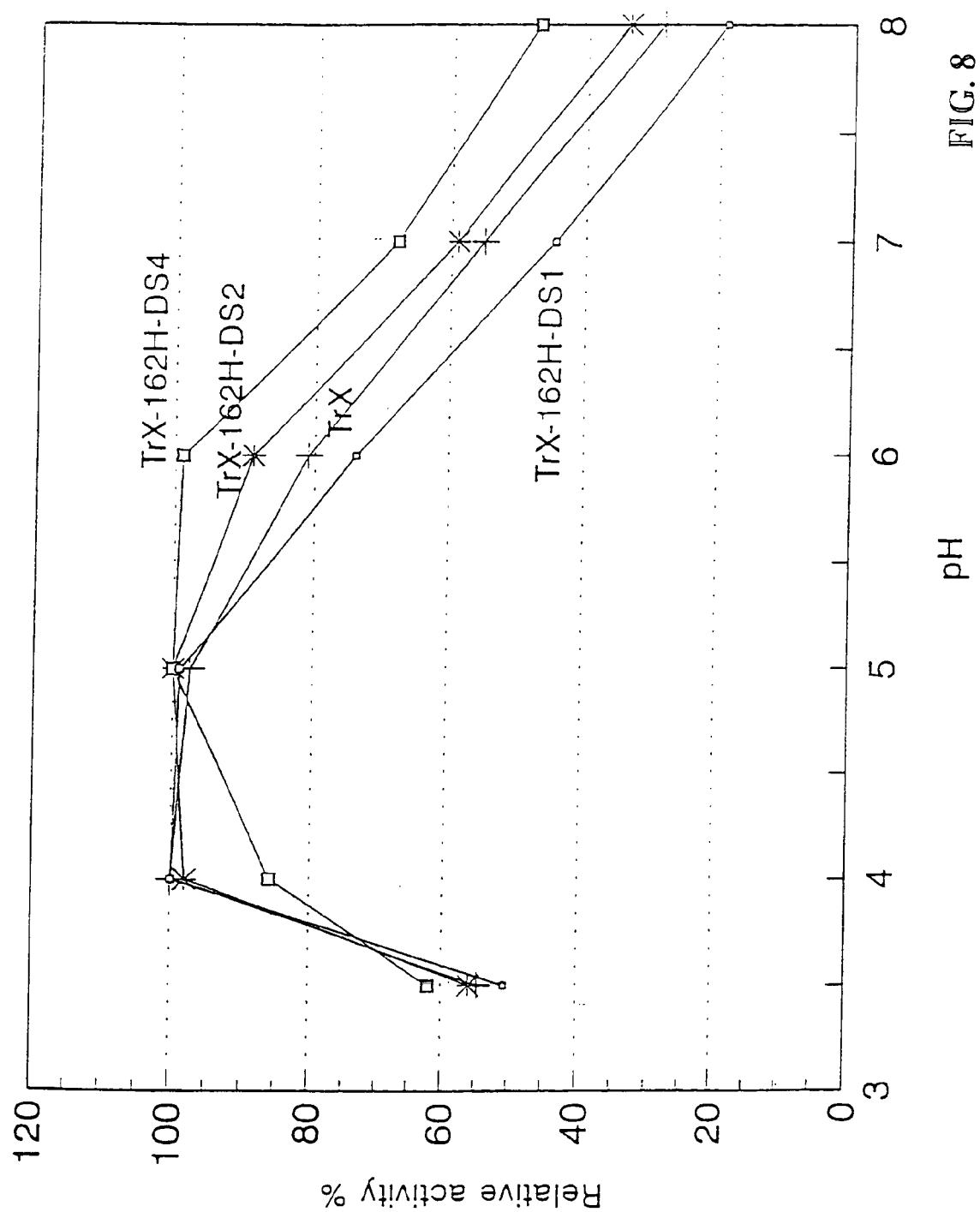
FIG. 8 shows the effect of pH on the release of xylose in a 7 min hydrolysis of soluble xylan by TrX, TrX-162H-DS1. TrX-162H-DS2 and TrX-162H-DS4 at 40° C. The data are normalized to that observed at the pH optimum.

The present invention also relates to modified xylanase enzymes that exhibit increased thermostability while maintaining high activity at physiological pH and temperature. For example, and without wishing to limit the present invention in any manner, a modified *Trichoderma reesei* xylanase (TrX) is disclosed that exhibits increased thermostability while maintaining pH and temperature optima at or near physiological range. Two modifications in the TrX were combined in order to obtain a novel xylanase (TrX-162H-DS1). The first modification includes a double mutation to create two cysteines for the formation of a single disulfide bond. Such a modification has been described for *Bacillus circulans* xylanase (C100/C148; BcX amino acid numbering) in U.S. Pat. No. 5,405,769. However, this mutation bestows only a minor increase in the ability of the enzyme to withstand high temperatures (see TrX-DS1, FIGS. 3–5) and this modification is not adequate to produce an enzyme capable of surviving high temperatures associated with the pelleting process. When this mutation is combined with a second mutation as per the teaching of this invention, involving the substitution of a basic amino acid such as histidine (H) for glutamine (Q) in position 162, the resultant combination mutant xylanase exhibits the desired properties of thermostability (TrX-162H-DS1; see FIGS. 5 and 6), and greater than 40% of optimum activity at physiological pH (FIG. 8), and temperature (FIG. 7).

Another mutant xylanase in the present invention, TrX-162H-DS4 differs from TrX-162H-DS1 by possessing an additional disulfide (108/158, that is between positions 108 and 158). This type of double disulfide mutant has previously been described for the xylanase of *Bacillus circulans* (C98/C152, 100/148; BcX amino acid numbering; Wakarchuck et al. 1994 Protein Engineering, 7:1379–1386). The BcX mutant does not comprise an equivalent basic amino acid (e.g. H for Q at position 162) substitution as disclosed herein. The mutant TrX-162H-DS4 shows a dramatic increase of thermostability (see FIG. 4(*a*)), with an increase in the $T_{50}$ of TrX-162H-DS4 of 14° C. This is an improvement over the prior art double disulfide BcX mutant which exhibits an increase in the $T_{50}$ of 10° C., thereby demonstrating the contribution of the Q162H mutation in the disulfide mutants of TrX.

The present invention also pertains to additional mutations that have been found to be effective in producing a xylanase that exhibits thermostability and a desirable pH profile. An example of such mutations may be found in, but are not limited to, TrX-DS8. TrX-DS8 includes the mutations listed for N1-TX13 as disclosed in U.S. Pat. No. 5,759,840, namely N1OH, Y27M and N29L, and also includes N44D, Q125A, I129E, Q162H and a disulfide bond between positions 110 and 154. Trx-DS8 exhibits the property of thermostability (FIG. 4(*b*)), a pH profile parallelling that of TrX-162-DS 1, and greater than 40% of optimum activity at physiological pH, and temperature.

Xylanase enzymes comprising the substitution of H for Q at position 162 (termed Q162H) in isolation has been reported in U.S. Pat. No. 5,759,840, however, these mutants exhibited no improvement in thermostability or other properties over natural TrX. However, by combining these two modifications, several novel xylanases (TrX-162H-DS1, TrX-162H-DS2 and TrX-162H-DS4) were obtained with improved thermostability. This property was not observed with either mutation alone. Furthermore, these modified xylanases exhibit high activity at or near physiological temperature and pH. These mutations are also found in Trx-DS8, which also exhibits improved thermostability and high activity at or near physiological conditions.

Following the methods of the present invention novel xylanase enzymes may be obtained that are far more suitable for feed pelleting applications than enzymes currently available. Similar modifications may be made in other Family 11 xylanases, including but not limited to, xylanase enzymes obtained from *Trichoderma*, *Streptomyces* and *Schizophyllum*. However, it is also within the scope of the present invention that other xylanase enzymes, in addition to Family 11 xylanases can be modified as disclosed herein in order to obtain xylanases with that are thermostable and exhibit high activity at physiological pH and temperature. Furthermore, it is within the scope of the present invention that native xylanase enzymes with the properties of thermostability and high activity at physiological pH and temperature may be obtained following screening protocols that select for both thermostability and high activity at physiological pH and temperature.

In use, the formulation of the feed enzyme can improve the enzymes thermostability, as adsorption into feed improves stability as the enzyme is brought into contact with its substrate. Therefore, in determining thermostability of the xylanases of the present invention, xylanases were characterized in the presence and absence of stabilizing agents, for example but not limited to glycerol. Fisk and Simpson (1993) have reported that 40% glycerol enhanced the temperature tolerance of wild type TrX by less than +10° C., however, this is much less stability than the enzymes of the present invention. The combination-mutant xylanases of the present invention can tolerate incubation in buffer at a higher temperature (59–69° C.), as compared to natural xylanase (55° C.; also see FIGS. 3 and 4). In the presence of 40% glycerol, the combination mutants can retain a substantial portion of their activity at 70 to 90° C. (see FIG. 5), while the natural xylanase is totally inactivated at these temperatures.

One of the modifications to the combination mutant xylanase as proposed herein is the substitution of amino acid 162 (TrX numbering, based on Tr2 in FIG. 1; which for TrX is glutamine) with the basic amino acid histidine (termed Q162H). However, it is considered within the scope of the present invention that other amino acids may also be substituted at this position. Preferably the substituted amino acid is basic (positively charged), for example lysine (Q162K) or arginine (Q162R). It has been observed herein that the substitution at the position 162, or its equivalent in other Family 11 xylanases, by a basic amino acid such as histidine can greatly improve the thermostability of a xylanase enzyme that comprises at least one intramolecular disulfide bond. Importantly, it has also been observed herein that this substitution at position 162 not only increases thermostability but also does not significantly change the temperature and pH profiles, and the specific activity of the modified xylanase.

Histidine-162 residue (TrX numbering) in the combination mutant is found in several natural Family 11 xylanases, such as those of *Trichoderma harzianum*, *Aspergillus niger*, var. *awamori*, *Aspergillus tubigensis*, *Thermomonospora fusca*, *Bacillus circulans* and *Bacillus subtilis* in the corresponding position. Similarly, *Clostridium acetobutylicum* comprises a lysine at this equivalent position. However, all, of these xylanases, with the exception of the *Thermomonospora fusca* xylanase, are produced by mesophilic hosts and exhibit low thermostability. As a result there is no evidence to suggest any beneficial effect on thermostability by presence of a basic amino acid residue at this position. In the *Thermomonospora fusca* xylanase, the N-terminal sequence (1–29) which is distant from the site of the present invention, has been shown to contribute to thermostability, and there is no evidence to suggest that thermostability may be associated with a histidine at this equivalent position (i.e. TrX 162).

This invention is also directed to xylanases that comprise at least one modification that results in increased thermostability while maintaining high activity at physiological pH and temperature. For example, native *Schizophyllum commune* xylanase has a disulfide bond at positions 110/154 (TrX numbering). However, this enzyme exhibits low thermostability, Therefore, this enzyme can be modified using the methods of the present invention to substitute a basic amino acid, either histidine, arginine or lysine for the naturally occurring leucine at position 200 of *Schizophyllum commune* (which is equivalent to position 162 using TrX numbering; see FIG. 1; Sc). Therefore, increased thermostability can be achieved through a one-step modification.

Also considered within the scope of the present invention are combination mutants comprising both an intramolecular disulfide bond and a basic amino acid substitution as outlined above. The intramolecular disulfide bond may arise as a result of a mutation at one or more specific residues, for example (per TrX numbering):

residues-110/-154, for example, but not limited to TrX-162H-DS1 or Trx-DS8;

residues-108/-158, for example, but not limited to TrX-162H-DS2; or residues-108/-158,-110/-154, for example, but not limited to TrX-162H-DS4.

Also considered within the scope of the present invention are modifications of thermostable xylanases, for example, but not limited to TfX. These modifications maintain the thermostability of the native enzyme, yet alter the pH and temperature optima so that they exhibit high activity at physiological pH and temperature not normally associated with the enzyme.

TABLE 2

Modified xylanases

| XYLANASE | DESCRIPTION |
| --- | --- |
| wild type TrX | wild type *T. reesei* xylanase. |
| TrX-162H | TrX mutant with mutation Q162H. |
| TrX-DS1 | TrX mutant with an intramolecular disulfide bond between positions-110 and 154. |
| TrX-162H-DS1 | TrX mutant with two mutations, (i) a disulfide bond between positions-110 and 154, and (ii) mutation Q162H. |
| TrX-162H-DS2 | TrX mutant with two mutations, (i) an intramolecular disulfide bond between positions-108 and 158, and (ii) mutation Q162H. |
| TrX-162H-DS4 | TrX mutant with two mutations, (i) two intramolecular disulfide bonds at residues-110/154 and residues-108/158, and (ii) mutation Q162H. |
| TrX-DS8 | Trx mutant with i) an intramolecular disulfide bond between positions-110 and 154, and ii) comprising mutations N10H, Y27M, N29L, N44D, Q125A, I129E, and Q162H |

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

EXAMPLES

Example 1

Construction of the *Trichoderma reesei* mutant xylanases

Basic recombinant DNA methods like plasmid preparation, restriction enzyme digestion, polymerase chain reaction, oligonucleotide phosphorylation, ligation, transformation and DNA hybridization were performed according to well-established protocols familiar to those skilled in the art (Sung, W. L., Yao, F.-L., Zahab, D. M. and Narang, S. A. (1986) Proc. Natl. Acad. Sci. USA 83:561–565) or as recommended by the manufacturer of the enzymes or kit. The buffer for many enzymes have been supplied as part of a kit or constituted following to the instruction of the manufacturers. Restriction enzymes, T4 polynucleotide kinase and T4 DNA ligase were purchased from New England BioLabs LTD, Mississauga, Ont. A precursor plasmid pXYbc has previously prepared and published (Sung, W. L., Luk, C. K., Zahab, D. M. and Wakarchuk, W. (1993) Protein Expression Purif. 4:200–206; U.S. Pat. No. 5,405, 769). A commonly used *E. coli* strain, HB101 (clonetech Lab, Palo Alto, Calif.) was used as transformation and expression host for all gene construct. Birchwood xylan was purchased from Sigma (St. Louis, Mo.). Hydroxybenzoic acid hydrazide (IIBAH) was purchased from Aldrich. Oligonucleotides were prepared with an Applied Biosystem DNA synthesizer, model 380B. Xylanase assays have been performed in a covered circulating water bath (Haake type F 4391) with a fluctuation of "0.1° C. Temperature of the water bath was confirmed with a thermocouple.

A. Construction of the precursor plasmid pTrX

The precursor plasmid pTrX for all subsequent mutations is published (Sung et al, 1995). This plasmid is derived from a pUC119 plasmid with a synthetic nucleotide sequence encoding a *Trichoderma reesei* xylanase inserted (FIG. 2). Expression of this xylanase and other mutant xylanases subsequently described are under the control of the lac promoter of the pUC plasmid. The total assembly of the gene required two stages, initially for the (92–190) region, then followed by the (1–92) region. The protocol for the construction of this gene is routine and identical to the standard published procedure for many other genes. It required enzymatic phosphorylation of overlapping synthetic oligonucleotides which encodes xylanase. This was followed by their ligation into a appropriately cut plasmid pUC119.

Initially ten overlapping oligonucleotides:
XyTv-101, SEQ ID NO:28
XyTv-102, SEQ ID NO:29
TrX-103, SEQ ID NO:30
XyTv-104, SEQ ID NO:31
XyTv-105, SEQ ID NO:32
XyTv-106, SEQ ID NO:33
XyTv-107, SEQ ID NO:34
TrX-108, SEQ ID NO:35
XyTv-109, SEQ ID NO:22
XyTv-110, SEQ ID NO:36 encoding the TrX(92–190) sequence (FIG. 2), were designed with codon usage frequency imitating that of *E. coli* (Chen et al. 1982). The SalI and BglII cohesive ends of two terminal oligonucleotides enabled the enzymatic ligation of the ten fragments to the linearized plasmid pXYbc. The ten oligonucleotides (50 pmol, 1 L for each) encoding the TrX(92–190) was phosphorylated in a mixture containing 10× standard kinase buffer (0.4 L), 1 mM ATP (4 L), T4 DNA kinase (5 units), and water (3 L). Phosphorylation reaction was carried out for 1 h at 37° C. The solutions were then combined and heated to 70° C. for 10 min. After being cooled slowly to room temperature, the combined solutions were added to a mixture of 4 mM ATP (3.5 L), EcoR1-HindIII linearized plasmid pUC119 (0.1 pmol), and T4 DNA ligase (3.5 L) and incubated at 12° C. for 20 h. Aliquots of the ligation mixture were used to transform *E. coli* HB101 in YT plate (8 g yeast extract, 5 g bacto-tryptone, 5 g NaCl, 15 g of agar in 1 L of water) containing ampicillin (100 mg/L).

For the preparation of a hybridization probe, one of the oligonucleotide XyTv-110 (10 pmol, 1 L) was phosphorylated $^{32}$P-ATP (10 pmol, 3 L) in T4 DNA kinase (1 L), 10× kinase buffer (1 L), and water (4 L) at 37° C. for 1 h.

Transformants were selected randomly for hybridization analysis. Colonies were grown on nylon filters on YT plates with ampicillin overnight. They were then denatured with 0.5N NaOH-1.5M NaCl (10 min) and neutralized with 0.5N Tris-HCl (pH 7.0)-1.5M NaCl (10 min). After irradiation by UV of 254 nm for 8 min, the filters were washed with 6X SSC-0.05% Triton X-100 for 30 min. Cell debris was scraped off completely. After another 30 min. in fresh solution, the duplicate filters were transferred individually into separate mixtures of 6X SSC -1% dextran sulphate-0.05% TritonX-100-1X Denhardt's hybridization fluid. The $^{32}$P-labelled probe was added to the filter. After 16 h at 45° C., the filter was washed twice with 6×SSC -0.05% TritonX-100 at room temperature for 5 min. and then at 65° C. for 30 min. Positively hybridized clones with the intermediate plasmid pBcX.TrX were identified by auto-radiographic analysis.

The above protocol, involving enzymatic phosphorylation of synthetic overlapping oligonucleotides and ligation into a linearized plasmid, has again been used in the assembly of the TrX(1–92) region and in the cassette mutagenesis for the subsequent generation of other mutant series described in this invention.

For the assembly of the TrX(1–92) region to complete the full-length *Trichoderma* gene, the intermediate plasmid pBcX.TrX was linearized by NheI and KpnI endonucleases to release the DNA insert for BcX(1–83). With NheI and KpnI cohesive ends, eight overlapping oligonucleotides:
TrX-1, SEQ ID NO:37
XyTv-2, SEQ ID NO:38
TrX-3, SEQ ID NO:39
XyTv-4, SEQ ID NO:40
XyTv-5, SEQ ID NO:41
TrX-6, SEQ ID NO:42
XyTv-7, SEQ ID NO:43
TrX-8, SEQ ID NO:44, encoding the published TrX(1–91) sequence were ligated into the linearized plasmid pBcX.TrX (FIG. 2), via the protocol described above. The new plasmid pTrX therefore harbored a synthetic TrX gene (SEQ ID NO: 18).

All mutant xylanases described below have been constructed via the method of cassette mutagenesis as described above. The protocol for the cassette mutagenesis was identical to that for gene assembly fully described above. Such cassette mutagenesis involved (i) enzymatic phosphorylation of overlapping synthetic oligonucleotides, (ii) their ligation with the linearized plasmid, (iii) transformation into the *E. coli* HB101 competent cells, (iv) identification of the mutant transformants via hybridization with the labelled oligonucleotide as probe, and (v) confirmation of the mutation through dideoxy nucleotide sequencing.

B. Construction of the plasmid pTrX-DS1

The mutant TrX-DS1 (SEQ ID NO's54, 55) was identical to TrX with a covalent disulfide bond between residues-110 and 154. This was accomplished through two single mutations, ie. conversion of both residues serine-110 and asparagine-154 to cysteine. Upon expression of the mutant xylanase, these two cysteine residues will form a disulfide bond. The construction of the plasmid pTrX-DS 1 was through ligation of the following overlapping phosphorylated oligonucleotides:
TX-110C SEQ ID NO:19,
TX-110-2 SEQ ID NO:20,
TX-103b SEQ ID NO:21
XyTv-109 SEQ ID NO:22,
TX-108b SEQ ID NO:23,
TX-154C SEQ ID NO:24
TX-154C-2 SEQ ID NO:25, into KasI/AvrII-linearized plasmid pTrX in a cassette mutagenesis as shown below.

```
                           TX-110C-2
    |                          |
    101 102 103 104 105 106 107 108 109 110 111 112 113 114 115
     G   A   T   K   L   G   E   V   T   C   D   G   S   V   Y
5'-GC GCC ACA AAA TTA GGC GAA GTC ACT TGT GAT GGA TCC GTA TAT
   3'-G TGT TTT AAT CCG CTT CAG TGA ACA CTA CCT AGG CAT ATA
     KasI|              TX-110C                                |

TX-103b
                                                    |
    116 117 118 119 120 121 122 123 124 125 126 127 128 129 130 131
     D   I   Y   R   T   Q   R   V   N   Q   P   S   I   I   G   T
    GAT ATC TAC CGT ACC CAA CGC GTT AAT CAG CCA TCG ATC ATT GGA ACC
    CTA TAG ATG GCA TGG GTT GCG CAA TTA GTC GGT AGC TAG TAA CCT TGG
                           XyTv-109

132 133 134 135 136 137 138 139 140 141 142 143 144 145 146 147
     A   T   F   Y   Q   Y   W   S   V   R   N   H   R   S   S
    GCC ACC TTT TAT CAG TAC TGG AGT GTT AGA CGT AAT CAT CGG AGC TCC
    CGG TGG AAA ATA GTC ATG ACC TCA CAA TCT GCA TTA GTA GCC TCG AGG
     |                                       TX-108b

TX-154C-2
    |            |
    148 149 150 151 152 153 154 155 156 157 158 159 160 161 162 163
     G   S   V   N   T   A   C   H   F   N   A   W   A   Q   Q   G
    GGT TCG GTT AAT ACT GCA TGC CAC TTT AAT GCC TGG GCA CAG CAA GGG
    CCA AGC CAA TTA TGA CGT ACG GTG AAA TTA CGG ACC CGT AGT GTT CCC
                     |         SphI       TX-154C

|
    164 165 166 167
     L   T   L   G
    TTA ACC
    AAT TGG GAT C
            AvrII   |
```

C. Construction of the plasmid pTrX-162H-DS1

The mutant TrX-162H-DS1 (SEQ ID NO:56) was identical to TrX-DS1 with a single mutation of glutamine-162 into histidine. The construction of the plasmid pTrX 162H-DS1 was through ligation of oligonucleotides:

TX-162H-3 SEQ ID NO:26, and
TX-162H-4 SEQ ID NO:27 into SphI/AvrII-linearized plasmid pTrX-DS 1 in a cassette mutagenesis (SEQ ID NO's:26, 27, 56), as shown below.

tions, ie. conversion of both residues valine-108 and alanine-158 to cysteine. Upon expression of the mutant xylanase, these two cysteine residues will form a disulfide bond. The construction of the plasmid pTrX-162H-DS2 was through ligation of the following overlapping phosphorylated oligonucleotides:

TX-108C SEQ ID NO:45,
TX-108C-2 SEQ ID NO:46,
TX-103b SEQ ID NO:21,
XyTv-109 SEQ ID NO:22,
TX-108b SEQ ID NO:23,

```
                         TX-162H-3
                            |
    153 154 155 156 157 158 159 160 161 162 163 164 165 166 167
     A   C   H   F   N   A   W   A   Q   H   G   L   T   L   G
       5'-C CAC TTC AAT GCA TGG GCA CAG CAC GGG TTA ACC
    GT ACG GTG AAG TTA CGT ACC CGT GTC GTG CCC AAT TGG GAT C-5'
    SphI                                              AvrII
              TX-162H-4
```

D. Construction of the plasmid pTrX-162H-DS2

The mutant TrX-162H-DS2 (SEQ ID NO's:57, 58) was identical to TrX, but with a covalent disulfide bond between residues-108 and 158, and a mutation glutamine-162 to histidine. The 108/158 disulfide required two single muta- TX-158C-162H SEQ ID NO:47, and TX-158C-162H-2 SEQ ID NO:48 into the KasI/AvrII-linearized plasmid pTrX in a cassette mutagenesis (SEQ ID NO's:57, 58) as shown below.

```
                           TX-108C-2
    |                          |
    101 102 103 104 105 106 107 108 109 110 111 112 113 114 115
     G   A   T   K   L   G   E   C   T   S   D   S   S   V   Y
5-GC GCC ACA AAA TTA GGC GAA TGC ACT AGT GAT GGA TCC GTA TAT
   3'-G TGT TTT AAT CCG CTT ACG TGA TCA CTA CCT AGG CAT ATA
     KasI|              TX-108C                              |

TX-103b
                                                    |
```

```
                                                    -continued
116 117 118 119 120 121 122 123 124 125 126 127 128 129 130 131
 D   I   Y   R   T   Q   R   V   N   Q   P   S   I   I   G   T
GAT ATC TAC CGT ACC CAA CGC GTT AAT CAG CCA TCG ATC ATT GGA ACC
CTA TAG ATG GCA TGG GTT GCG CAA TTA GTC GGT AGC TAG TAA CCT TGG
                           XyTV-109

132 133 134 135 136 137 138 139 140 141 142 143 144 145 146 147
 A   T   F   Y   Q   Y   W   S   V   R   R   N   H   R   S   S
GCC ACC TTT TAT CAG TAC TGG AGT GTT AGA CGT AAT CAT CGG AGC TCC
CGG TGG AAA ATA GTC ATG ACC TCA CAA TCT GCA TTA GTA GCC TCG AGG
                                                TX-108b

TX-158C-162H-2
148 149 150 151 152 153 154 155 156 157 158 159 160 161 162 163
 G   S   V   N   T   A   N   H   F   N   C   W   A   Q   H   G
GGT TCG GTT AAT ACT GCA AAT CAC TTT AAT TGC TGG GCA CAG CAC GGG
CCA AGC CAA TTA TGA CGT TTA GTG AAA TTA ACG ACC CGT AGT GTG CCC
                                        TX-158C-162H 164 165 166 167
 L   T   L   G
TTA ACC
AAT TGG GAT C
        AvrII
```

E. Construction of the plasmid pTrX-162H-DS4

The mutant TrX-162H-DS4 (SEQ ID NO's:59, 60) was identical to TrX, but with two covalent disulfide bonds 108/158 and 110/154 and a mutation glutamine-162 to histidine. The two disulfides required four single mutations, ie. conversion of the residues valine-108, serine-110, asparagines-154 and alanine-158 to cysteine. Upon expression of the mutant xylanase, these four cysteine residues will form two disulfide bonds. The construction of the plasmid pTrX-162H-DS4 was through ligation of the following overlapping phosphorylated oligonucleotides:

TX-108C-110C SEQ ID NO:49,
TX-108C-110C-2 SEQ ID NO:50,
TX-103b SEQ ID NO:21,
XyTv-109 SEQ ID NO:22,
TX-108b SEQ ID NO:23,

TX-154C-158C-162H SEQ ID NO:51, and

TX-154C-158C-162H-2 SEQ ID NO:52 into the KasI/AvrII-linearized plasmid pTrX in a cassette mutagenesis (SEQ ID NO's:59, 60), as shown below.

```
                              TX-108C-110C-2
   101 102 103 104 105 106 107 108 109 110 111 112 113 114 115
    G   A   T   K   L   G   E   C   T   C   D   G   S   V   Y
 5'GC GCC ACA AAA TTA GGC GAA TGC ACT TGT GAT GGA TCC GTA TAT
 3'-G TGT TTT AAT CCG CTT ACG TGA ACA CTA CCT AGG CAT ATA
    KasI            TX-108C-110C

TX-103b
116 117 118 119 120 121 122 123 124 125 126 127 128 129 130 131
 D   I   Y   R   T   Q   R   V   N   Q   P   S   I   I   G   T
GAT ATC TAC CGT ACC CAA CGC GTT AAT CAG CCA TCG ATC ATT GGA ACC
CTA TAG ATG GCA TGG GTT GCG CAA TTA GTC GGT AGC TAG TAA CCT TGG
                           XyTv-109

132 133 134 135 136 137 138 139 140 141 142 143 144 145 146 147
 A   T   F   Y   Q   Y   W   S   V   R   R   N   H   R   S   S
GCC ACC TTT TAT CAG TAC TGG AGT GTT AGA CGT AAT CAT CGG AGC TCC
CGG TGG AAA ATA GTC ATG ACC TCA CAA TCT GCA TTA GTA GCC TCG AGG
                                                TX-108b

TX-154C-158C-162H-2
148 149 150 151 152 153 154 155 156 157 158 159 160 161 162 163
 G   S   V   N   T   A   C   H   F   N   C   W   A   Q   H   G
GGT TCG GTT AAT ACT GCA TGC CAC TTT AAT TGC TGG GCA CAG CAC GGG
CCA AGC CAA TTA TGA CGT ACG GTG AAA TTA ACG ACC CGT AGT GTG CCC
                         SphI          TX-154C-158C-162H 164 165 166 167
 L   T   L   G
```

```
TTA ACC
AAT TGG GAT C
        AvrII
```

-continued

F. Construction of TrX-DS8

The mutant TrX-DS8 was prepared using analogous methods as those outlined above in Sections A to E for the preparation of modified xylanases. TrX-DS8 incorporates the mutations found in N1-TX13 as disclosed in U.S. Pat. No. 5,759,840. This mutations are N10H, Y27M and N29L. In addition, TrX-DS8 includes the following mutations: N44D, Q125A, I129E, Q162H and a disulfide bond between positions 110 and 154. The construction of the plasmid pTrX-DS8 was through ligation of overlapping phosphorylated oligonucleotides as described above.

Trx-DS8 exhibits the property of thermostability (FIG. 4a), a pH profile parallelling that of TrX-162-DS1, and greater than 40% of optimum activity at physiological pH, and temperature.

Example 2

Characterization of Mutant Xylanases

A. Production of xylanases

The culture condition was identical to the well-established protocol described for other *E. coli*-expressed xylanases. A 5 ml of overnight inoculant in 2YT medium (16 g yeast extract, 10 g bacto-tryptone. 5 g NaCl, 1 L of water) containing ampicillin (100 mg/L) was added to 2YT medium (1 L) with ampicillin. The cultures were grown with shaking (200 rpm) at 37° C. After 16 hr. cells were harvested.

B. Purification of different disulfide bond-containing mutant xylanases

Protein samples were prepared from cells by first making an extract of the cells by grinding 10 g of the cell paste with 25 g of alumina powder. After grinding to smooth mixture, small amounts (5 mL) of ice cold buffer A (10 mM sodium acetate, pH 5.5 for BcX mutants) or buffer B (10 mM sodium acetate, pH 4.6 for TX mutants) were added and the mixture ground vigorously between additions. The alumina and cell debris were removed by centrifugation of the mixture at 8000×g for 30 min.

The crude extract was heated at 60° C. for 15 min and centrifugation to remove a large amount of precipitate. The supernatant was acidified to pH 4.6, frozen at −20° C. overnight, thawed and centrifuged to remove more precipitate.

After the above pretreatment, the cell extract committed to column chromatography and was pumped onto a 50 mL bed volume, S-Sepharose fast flow, cation exchange column (Kabi-Pharmacia, Canada), equilibrated in buffer A. The xylanase was eluted with a 300 mL linear gradient of 0 to 0.3M NaCl in buffer A at a flow rate of 3 mL/min. The xylanase elutes at 100 to 150 mL of the gradient. The fractions are checked on SDS-PAGE, and those fractions having most of the xylanase were pooled, and concentrated by ultrafiltration using 3000 dalton molecular weight cutoff membranes (Amicon YM3). The concentrated material (5 mL) was then applied to a 1.5 cm×85 cm TSK-HW50S gel filtration column, equilibrated in 50 mM ammonium acetate pH 6. The xylanase eluted at a volume of 90 to 100 mL. These fractions were analyzed by SDS-PAGE, and the peaks pooled as pure xylanase. The protein was quantified using the extinction co-efficient at 280 nm.

C. Standard assay for the measurement of enzymatic activity

The quantitative assay determined the number of reducing sugar ends generated from soluble xylan. The substrate for this assay was the fraction of birchwood xylan which dissolved in water from a 5% suspension of birchwood xylan (Sigma Chemical Co.). After removing the insoluble fraction, the supernatant was freeze dried and stored in a desiccator. The measurement of specific activity was performed as follows. Reaction mixtures containing 100 L of 30 mg/mL xylan previously diluted in assay buffer (50 mM sodium citrate, pH 5.5 or the pH optimum of the tested xylanase), 150 L assay buffer, 50 L of enzyme diluted in assay buffer were incubated at 40° C. At various time intervals 50 L portions were removed and the reaction stopped by diluting in 1 mL of 5 mM NaOH. The amount of reducing sugars was determined with the hydroxybenzoic acid hydrazide reagent (HBAH) (Lever, 1972, Analytical Biochem 47:273–279). A unit of enzyme activity was defined as that amount generating 1 mol reducing sugar in 1 minute at 40° C.

For the comparison between mutant and the wild type xylanases (TABLE 3), the specific activities of a xylanase was converted to the relative activity which is its calculated in percentage as compared to the specific activity of the natural xylanase.

TABLE 3

| Relative activity of TrX xylanases | |
|---|---|
| Xylanase | Relative activity % |
| natl. TrX | 100* |
| TrX | 103 |
| TrX-DS1 | 116 |
| TrX-162H-DS1 | 102 |
| TrX-162H-DS4 | 91 |

*The specific activity of the natural TrX (770 U/mg) was normalized to 100%.

As can be seen form Table 3, the specific enzymatic activities of the mutant xylanases at 40° C. have not been changed significantly as compared to the natural xylanases.

Example 3

Thermostability of Mutant Xylanases

This was a test of the tolerance of xylanase to incubation at a set temperature, without any substrate. The xylanase (150 g/mL) in assay buffer (50 mM sodium citrate) was incubated at a set temperature or set period of time. Aliquots were cooled to room temperature (around 20° C.), the residual enzymatic activity of all samples was determined via the HBAH assay at 40° C., as stated in Example 2C.

(A) Effect of length of incubation

The effect of the length of incubation on the activity of xylanase samples was determined at 62.5° C. at pH 5.5 (FIG. 3). Aliquots were removed at 0, 5, 10, 20, 30, 40 and 60 min for the determination of residual activity. The residual enzymatic activity at 0 min was normalized to 100%.

After 5 mins of incubation, the wild type TrX and the Q 162H mutant TrX-162H (U.S. Pat. No. 5,759,840) almost lost all residual activity, while the mutant TrX-DS 1 with a disulfide bond, retained 60% of it residual activity. However, it retained only 20% of its activity at 20 mins and lost all activity at 40 min. In contrast, the mutant TrX-162H-DS1, with the additional mutation of Q162H, showed superior thermostability by retaining about 87% of its activity at 20 min, 78% at 40 min and 68% at 60 min. The mutant TrX-162H-DS4 with both 108/158 and 110/154 disulfide bonds retained 84% activity after 60 min.

(B) Effect of incubation temperatures on the residual activity of mutant TrX.

Thermostability of mutant TrX enzymes was also determined by tolerance of different incubation temperatures. Samples of xylanases were incubated in 50 mM sodium citrate buffer (pH 5.5) at different temperatures (48, 52, 56, 60, 64, 68, 70 and 72° C.) for 30 min. The residual enzymatic activity of the samples was determined, with the residual activity at 48° C. normalized to 100% (see FIGS. 4(a) and 4(b)). The $T_{50}$, which is the incubation temperature allowing the maintenance of 50% residual activity after 30 min, was determined for each mutant TrX.

Without wishing to be bound by theory, the higher $T_{50}$ of TrX-162H-DS1 (65° C.) versus TrX-DS 1 (61° C.) demonstrates the enhancement of thermostability by the mutation Q162H in the disulfide mutants. The double disulfide mutant TrX-162H-DS4 also exhibited high stability with a $T_{50}$ gain of +14° C. over the natural TrX. Comparison of $T_{50}$ of TrX-162H-DS1 (65° C.) and TrX-162H-DS2 (59° C.) indicates that the 110/154 disulfide in TrX-162H-DS1 contributes greater thermostability than the 108/158 dislufide in the latter. TrX-DS8 also exhibited high thermostability, with a $T_{50}$ gain of +16° C. when compared to natural TrX.

(C) Effective incubation temperature

In the following example, a model study of the effect of the enzyme formulation on thermostability of the combination mutant was conducted in the presence of an additive, glycerol. The unmodified TrX and the mutant TrX xylanases were incubated for 30 min at 20, 50, 60, 70, 80 and 90° C. in a buffer (pH 5.0) with 40% glycerol. The residual activity was determined by the HBAH assay. The residual enzymatic activity at 0 min was normalized to 100% (FIG. 5).

At 50° C., all TrX samples retained their enzymatic activity. At 60° C., the wild type TrX retained 75% of its activity while TrX-DS1 and TrX-162H-DS1 retained 80 and 100% respectively (FIG. 5). At 70° C., TrX-DS1 and TrX-162H-DS1 maintained 10 and 98% respectively. At 90 min, the latter retained 65% of the residual activity.

(D) Effect of incubation time on the residual activity of TrX-162H-DS 1 at 90° C.

Sample of TrX-162H-DS 1 in 40% glycerol and buffer were incubated in a covered circulating water bath (Haake type F 4391, with a fluctuation of 0.1° C.) at 90° C. Temperature of the water bath was confirmed with a thermocouple. Aliqiots were removed at 0, 5, 10 and 30 min for assay of residual activity. The residual enzymatic activity at 0 min was normalized to 100%.

At 5, 10 and 30 min. TrX-162H-DS1 retained 90, 85 and 65% of the residual activity respectively (FIG. 6).

Example 4

Temperature/Activity Profile of Mutant Xylanases

This was a test on the effect on different temperatures to the enzymatic activity of the xylanase in the hydrolysis of soluble xylan. The procedure was identical to the standard assay (Example 2C) with changes in the incubation temperature and time. The enzymes (1.5 μg/mL) and soluble xylanase in 50 mM sodium citrate buffer of pH 4.5 were mixed and incubated in a circulating water bath at different temperatures. After 30 min, the amount of reducing sugars released from xylan was determined by HBAH and was calculated as relative activity, with the value at temperature optimum as 100%.

The effect of temperature on the hydrolysis of xylan was shown in FIG. 7. The natural TrX, TrX-DS 1, TrX-162H-DS 1, TrX-162H-DS2 and TrX-162H-DS4 enzymes all had the same temperature/activity profile, and the only difference is in the greater activity (80%) in mutant TrX-162H-DS4 as compared to the others (45%) at 60° C. These results indicate that the disulfide mutation, along with the Q162H mutation, has little or no effect on the optimal temperature (50° C.) of TrX. In addition, all of the enzymes shown in the figure exhibit at least 40% of their optimum activity from about 40 to about 50° C., which is suitable for feed pelleting applications.

Example 5 pH/Activity Profile of Mutant Xylanases

This was a test of the effect of different pH on the enzymatic activity of the xylanase in the hydrolysis of soluble xylan at the approximate physiological temperature of digesta.

The procedure was identical to the standard assay (Example 2C) with changes in the incubation temperature and time. The *Trichoderma* enzymes natural TrX and mutant TrX (30 μg/mL) and soluble xylan in 50 mM sodium citrate buffers of pH 3–8 were incubated together at 40° C. for 7 min. The amount of reducing sugars released from xylan was determined by HBAH and was calculated as relative activity, with the value at pH optimum as 100%.

The profile of the effect of pH on the enzymatic activity of TrX, TrX-162H-DS 1 and TrX-162H-DS2 (FIG. 8) are similar, thus indicating little or no effect of the mutations (disulfide bond formation and Q162H) on the pH optimum. The pH profile for TrX-DS8 was also similar to these modified xylanases (data not shown). All of the enzymes shown in the figure exhibit at least 40% of their optimum activity from about pH 3.5 to about pH 6, which is suitable for feed pelleting applications.

The double disulfide mutant TrX-162H-DS4 differed by showing slightly greater activity at the pH range higher than 6. At the acidic pH of 4–6 TrX, TrX-162H-DS 1, TrX-162H-DS2 and TrX-162H-DS4 maintained at least 75% optimal activity.

All citations listed herein are incorporated by reference.

The present invention has been described with regard to preferred embodiments. However, it will be obvious to persons skilled in the art that a number of variations and modifications can be made without departing from the scope of the invention as described herein.

REFERENCES

Arase, A., Yomo, T., Urabe, I., Hata, Y., Katsube, Y. and Okada, H. (1993) FEBS Lett. 316:123–127.

Beauchemin, K. A., Jones, S. D. M., Rode, L. M., and Sewalt, V. J. H. (1997) Can. L. Animal Sci. 77:645–653.

Beauchemin, K. A. and Rode, L. M. (1997) in Dairy Research Results from the Agriculture and Agri-Food Canada Research Center, Lethbridge, 1E1:1–2.

Bedford, M. R. and Classen, H. L. (1992) in Xylans and Xylanases, edited by J. Visser, G. Beldman, M. A. Kusters-van Someren and A. G. J. Voragen, published by Elsevier, Amsterdam. 1992. p361–370.

Cowan, D. A. (1995) Essays Biochem. 29:193–207.

Fisk, R. S. and Simpson, C. (1993) in Stability and Stabilization of Enzymes, edited by W. J. J. van den Tweel, A. Harder and R. M. Buitelaar; published by Elsevier Science Publishers B. V. pp323–328.

Gupta, M. N. (1991) Biotech. Applied Biochem. 14:1–11.

Irwin, D., Jung, E. D. and Wilson, D. B. (1994) Appl. Environ. Microbiol. 60:763–770.

Paloheimo, M., Mantyla, A., Vehmaanpera J., Hakola, S., Lantto, R., Lahtinen, T., Parkkinen. E., Fagerstrom, R. and Suominen, P. (1997) in Carbohydrases from *Trichoderma reesei* and Other Microorganisms p255–264.

Sung, W. L. Yao. F. L. Zahab, D. M. and Narang, S. A. (1986) Proc. Natl. Acad. Sci. USA 83:561–565.

Sung, W. L., Luk, C. K., Zahab, D. M. and Wakarchuk, W. (1993) Protein Expression Purif 4:200–206.

Sung, W. L., Luk, C. K., Chan, B., Wakarchuk, W., Yaguchi, M., Campbell, R., Willick, G., Ishikawa, K. and Zabab, D. M. (1995) Biochem. Cell. Biol. 73:253–259.

Torronen, A. and Rouvinen, J. (1995) Biochemistry 34:847–856.

Viveros, A., Brenes, A., Pizarro, M. and Castano, M. (1994) Animal Feed Sci. Technol. 48:237–251.

Wakarchuck W. W. Sung, W. L., Campbell, R. L., Cunningham, A., Watson, D. C. and Yaguchi, M. (1994) Protein Engineering 7:1379–1386.

What is claimed is:

1. An isolated, modified, Family 11 xylanase comprising at least one intramolecular disulfide bond and a basic amino acid at position 162, said position determined from sequence alignment of said modified xylanase with *Trichoderma reesei* xylanase II amino acid sequence defined in SEQ ID NO: 16, said modified xylanase exhibiting at least 40% of optimal activity from about pH 3.5 to about pH 6.0, and from about 40 to about 60° C., said modified xylanase exhibiting increased thermostablity relative to the corresponding natural xylanase.

2. The modified xylanase of claim 1 selected from the group consisting of TrX-162H-DS1 (SEQ ID NO: 62), TrX-162H-DS2 (SEQ ID NO: 63), TrX-162H-DS4 (SEQ ID NO: 64) and TrX-DS8 (SEQ ID NO: 65).

3. The modified xylanase of claim 2 wherein said xylanase is TrX-162H-DS1 (SEQ ID NO: 62).

4. The modified xylanase of claim 2, wherein said xylanase is TrX-162H-DS2 (SEQ ID NO: 63).

5. The modified xylanase of claim 2, wherein said xylanase is TrX-162H-DS4 (SEQ ID NO: 64).

6. The modified xylanase of claim 2, wherein said xylanase is TrX-DS8 (SEQ ID NO: 65).

7. A method of preparing animal feed comprising applying the isolated xylanase of claim 1 onto said animal feed to produce a xylanase-animal feed combination, and heat sterilizing said xylanase-animal feed combination.

8. The method of claim 7, wherein said animal feed is a poultry or swine feed.

9. The modified xylanase of claim 1, wherein the basic amino acid is selected from the group consisting of lysine, arginine, and histidine.

* * * * *